(12) United States Patent
Kawanabe

(10) Patent No.: US 10,819,207 B2
(45) Date of Patent: Oct. 27, 2020

(54) VOICE COIL MOTOR AND LENS MOVING DEVICE

(71) Applicant: FUJIFILM Corporation, Tokyo (JP)

(72) Inventor: Yuichi Kawanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 164 days.

(21) Appl. No.: 16/207,213

(22) Filed: Dec. 3, 2018

(65) Prior Publication Data

US 2019/0103798 A1  Apr. 4, 2019

Related U.S. Application Data

(63) Continuation of application No. PCT/JP2017/018967, filed on May 22, 2017.

(30) Foreign Application Priority Data

Jun. 3, 2016  (JP) ................................ 2016-111594

(51) Int. Cl.
*G02B 7/02* (2006.01)
*H02K 41/035* (2006.01)
(Continued)

(52) U.S. Cl.
CPC ........... *H02K 41/0356* (2013.01); *G02B 7/08* (2013.01); *G02B 7/09* (2013.01); *G02B 27/646* (2013.01); *G03B 5/00* (2013.01); *G03B 13/36* (2013.01); *H02K 33/18* (2013.01); *G03B 2205/0007* (2013.01); *G03B 2205/0069* (2013.01); *H02K 11/21* (2016.01)

(58) Field of Classification Search
CPC .... H02K 41/0356; H02K 33/18; H02K 11/21; G02B 7/08; G02B 7/09; G02B 27/646; G03B 5/00; G03B 13/36; G03B 2205/0007; G03B 2205/0069
USPC .......................... 359/811, 819, 822, 823, 824
See application file for complete search history.

(56) References Cited

U.S. PATENT DOCUMENTS 5,471,100 A  11/1995  Sakamoto et al.
5,631,505 A  5/1997  Stephany et al.
(Continued)

FOREIGN PATENT DOCUMENTS

CN  1094820  11/1994
CN  101013203  8/2007
(Continued)

OTHER PUBLICATIONS

"Written Opinion of the International Searching Authority (Form PCT/ISA/237) of PCT/JP2017/018967," dated Jul. 25, 2017, with English translation thereof, pp. 1-7.
(Continued)

*Primary Examiner* — William Choi
(74) *Attorney, Agent, or Firm* — JCIPRNET

(57) ABSTRACT

A yoke of a voice coil motor includes an outer yoke as a magnet holding portion and an inner yoke as a coil insertion portion. A magnet is fixed to the surface of the outer yoke facing the inner yoke. The inner yoke is inserted into a coil. Openings are provided toward both end positions of the outer yoke from a middle position of movement positions of the coil. The openings are formed to pass through the outer yoke. The outer yoke can be made lighter while a necessary thrust is ensured.

14 Claims, 18 Drawing Sheets

(51) Int. Cl.
*G02B 7/08* (2006.01)
*H02K 33/18* (2006.01)
*G02B 7/09* (2006.01)
*G02B 27/64* (2006.01)
*G03B 5/00* (2006.01)
*G03B 13/36* (2006.01)
*H02K 11/21* (2016.01)

(56) References Cited

U.S. PATENT DOCUMENTS

| | | | |
|---|---|---|---|
| 5,939,804 A | 8/1999 | Nakao et al. | |
| 7,450,321 B2 | 11/2008 | Shih et al. | |
| 2005/0184618 A1* | 8/2005 | Lee | H02K 41/0354 310/273 |
| 2006/0001987 A1 | 1/2006 | Maehara et al. | |
| 2007/0133092 A1 | 6/2007 | Maeda et al. | |
| 2010/0067889 A1 | 3/2010 | Suzuki | |

FOREIGN PATENT DOCUMENTS

| | | |
|---|---|---|
| JP | S56145770 | 11/1981 |
| JP | S59169358 | 9/1984 |
| JP | S63181660 | 7/1988 |
| JP | H06335220 | 12/1994 |
| JP | H11150972 | 6/1999 |
| JP | 2001238427 | 8/2001 |
| JP | 2005020901 | 1/2005 |
| JP | 2010072062 | 4/2010 |

OTHER PUBLICATIONS

"International Search Report (Form PCT/ISA/210) of PCT/JP2017/018967," dated Jul. 25, 2017, with English translation thereof, pp. 1-5.

"Office Action of China Counterpart Application", dated May 19, 2020, with English translation thereof, p. 1-p. 20.

* cited by examiner

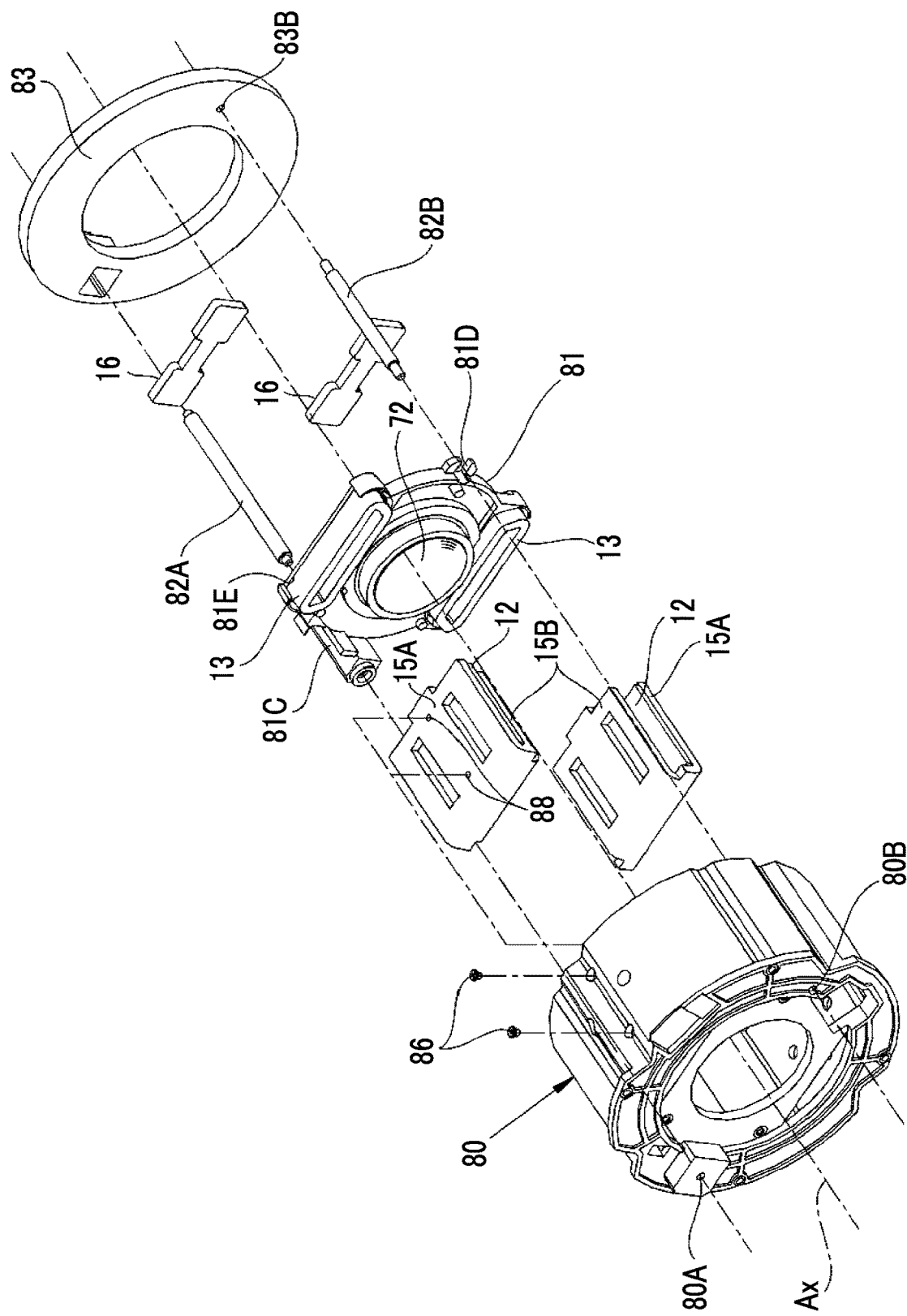

VOICE COIL MOTOR AND LENS MOVING DEVICE

CROSS-REFERENCE TO RELATED APPLICATIONS

This application is a Continuation of PCT International Application No. PCT/JP2017/018967 filed on 22 May 2017, which claims priority under 35 U.S.C § 119(a) to Japanese Patent Application No. 2016-111594 filed on 3 Jun. 2016. The above application is hereby expressly incorporated by reference, in its entirety, into the present application.

BACKGROUND OF THE INVENTION

1. Field of the Invention

The present invention relates to a voice coil motor and a lens moving device.

2. Description of the Related Art

In an imaging apparatus, such as a digital camera, and an optical device, such as a lens barrel, a demand for a reduction in size and weight is high in terms of portability and an improvement in the speed of auto focus is also required. For this reason, a linear actuator, such as a voice coil motor, is used instead of a rotary motor as an actuator that moves a movable lens of a focus lens group (for example, see JP2010-072062A (corresponding to US2010/0067889A1)).

Further, since a ferromagnetic body made of a heavy material is used in a voice coil motor, a cutout portion is formed in a yoke on which a permanent magnet is disposed for a reduction in weight (for example, see JP1994-335220A (JP-H06-335220A)). In JP1994-335220A (JP-H06-335220A), the cross-sectional area of a yoke (hereinafter, referred to as a magnet holding yoke), which holds the magnet, at the middle position of movement positions of the coil is made smaller than the cross-sectional areas of the magnet holding yoke at both end portions to form the cutout portion.

SUMMARY OF THE INVENTION

To obtain a necessary thrust in the voice coil motor, not only power to be supplied but also the volumes of the yoke and the magnet need to be increased to increase a thrust. However, since a magnetic material, such as iron, is particularly used for the yoke, the specific gravity of the yoke is higher than the specific gravity of a resin product or an aluminum product as another component. Accordingly, in a case in which a volume is increased, a necessary thrust is obtained but weight is increased by as much as an increase in volume.

For this reason, in JP1994-335220A (JP-H06-335220A), the cutout portion is formed in the yoke and the voice coil motor is made light due to the cutout portion. However, since the cross-sectional area of the magnet holding yoke at the middle position of the movement positions of the coil is made smaller than the cross-sectional areas of the magnet holding yoke at both end portions to form the cutout portion in JP1994-335220A (JP-H06-335220A), it is difficult to form the magnet holding yoke. Moreover, since the cross-sectional area of the yoke along which the coil is moved is changed, the movement of the coil is hindered. For this reason, unlike in the magnet holding yoke, a cutout portion cannot be formed in the yoke along which the coil is moved. Accordingly, the weight of the yoke cannot be reduced so much.

The invention provides a voice coil motor and a lens moving device that can obtain a necessary thrust while being further reduced in weight.

A voice coil motor of the invention includes a yoke, a magnet, a coil, and an opening. The yoke includes a magnet holding portion and a coil insertion portion that is formed in parallel with the magnet holding portion with a gap therebetween. The magnet is fixed to a surface of the magnet holding portion facing the coil insertion portion. The coil insertion portion is inserted into the coil, and the coil is moved along the coil insertion portion by the application of current. The opening is provided in the magnet holding portion toward both end positions of the magnet holding portion from a middle position of movement positions of the coil and is formed to pass through the magnet holding portion.

It is preferable that the opening is a rectangular slit formed to be long in a moving direction of the coil. In this case, the yoke can be efficiently made light. Further, it is preferable that the opening is a plurality of through-holes arranged in a moving direction of the coil. It is preferable that a plurality of the openings are arranged in a direction orthogonal to the moving direction of the coil. It is preferable that the opening is also formed in the coil insertion portion. Furthermore, it is preferable that the opening of the coil insertion portion is formed at a position facing the opening of the magnet holding portion.

An opening width, which is a length of the opening in the direction orthogonal to the moving direction, is preferably determined so that an integrated value of magnetic flux density distribution in the direction orthogonal to the moving direction of the coil at a portion where the opening is provided is equal to an integrated value of magnetic flux density distribution in the direction orthogonal to the moving direction at a start position, where the opening is not formed, of the movement positions of the coil. Alternatively, an opening width, which is a length of the opening in the direction orthogonal to the moving direction, is preferably determined so that a difference integrated value, which is obtained by subtracting an integrated value of magnetic flux density distribution in the direction orthogonal to the moving direction at a start position of the movement positions of the coil from an integrated value of magnetic flux density distribution in the direction orthogonal to the moving direction of the coil at the middle position, is equal to an integrated value of a reduction in magnetic flux density distribution caused by the opening in the direction orthogonal to the moving direction.

In a case in which a total width, which is the sum of lengths of the plurality of openings in the direction orthogonal to the moving direction of the coil, is denoted by H, a width of the yoke is denoted by WO, a remaining width, which is obtained by subtracting the total width H from the width WO of the yoke, is denoted by NH, and a thickness of the yoke is denoted by t1, it is preferable that the total width H and the remaining width NH satisfy "H≥t1", "NH≥t1", and "(WO/2)≥H".

It is preferable that the coil is formed in a trapezoidal shape where a coil wire length of a portion of the coil opposite to the magnet is shorter than a coil wire length of a portion of the coil facing the magnet in a state in which the coil is viewed in the moving direction of the coil. Since the coil is formed in the trapezoidal shape, the length of a portion of the coil on which an opposite thrust acts can be made short and a normal thrust can be increased by as much as a reduction in the length of the portion of the coil. Further, it is preferable that a width of the coil insertion portion is smaller than a width of the magnet holding portion which is a length of the magnet holding portion in the direction orthogonal to the moving direction of the coil. In this case, the coil is easily formed in a trapezoidal shape. Furthermore, it is preferable that both end portions of a surface of the coil insertion portion, which is opposite to a surface of the coil insertion portion facing the magnet, in the direction orthogonal to the moving direction of the coil include chamfers. In this case, the trapezoidal coil is easily moved.

A voice coil motor of the invention comprises a yoke, a magnet, a coil, and a plurality of openings. The yoke includes a magnet holding portion and a coil receiving portion held in parallel with the magnet holding portion with a gap therebetween. The magnet is fixed to a surface of the magnet holding portion facing the coil receiving portion and includes an N-polar surface on one side of a boundary line and an S-polar surface on the other side thereof. The coil is provided between the magnet and the coil receiving portion and is moved along the coil receiving portion in a direction orthogonal to the boundary line. The openings are formed to pass through the magnet holding portion and are arranged on both sides of the boundary line in parallel with the boundary line. Even in this case, a necessary thrust can be obtained while an increase in weight is suppressed.

A lens moving device of the invention comprises the voice coil motor, a first member that is connected to the yoke, and a second member that is connected to the coil; and the first member and the second member are moved relative to each other in the moving direction of the coil by the application of current to the coil, so that a lens is moved. In this case, since a necessary thrust can be obtained while an increase in weight is suppressed, the lens can be efficiently moved.

According to the invention, it is possible to provide a voice coil motor and a lens moving device that can obtain a necessary thrust while being further reduced in weight.

BRIEF DESCRIPTION OF THE DRAWINGS

FIG. 24 is an exploded perspective view of the focus mechanism in the optical axis direction that is viewed from the front side.

DESCRIPTION OF THE PREFERRED EMBODIMENTS

Figure 1:
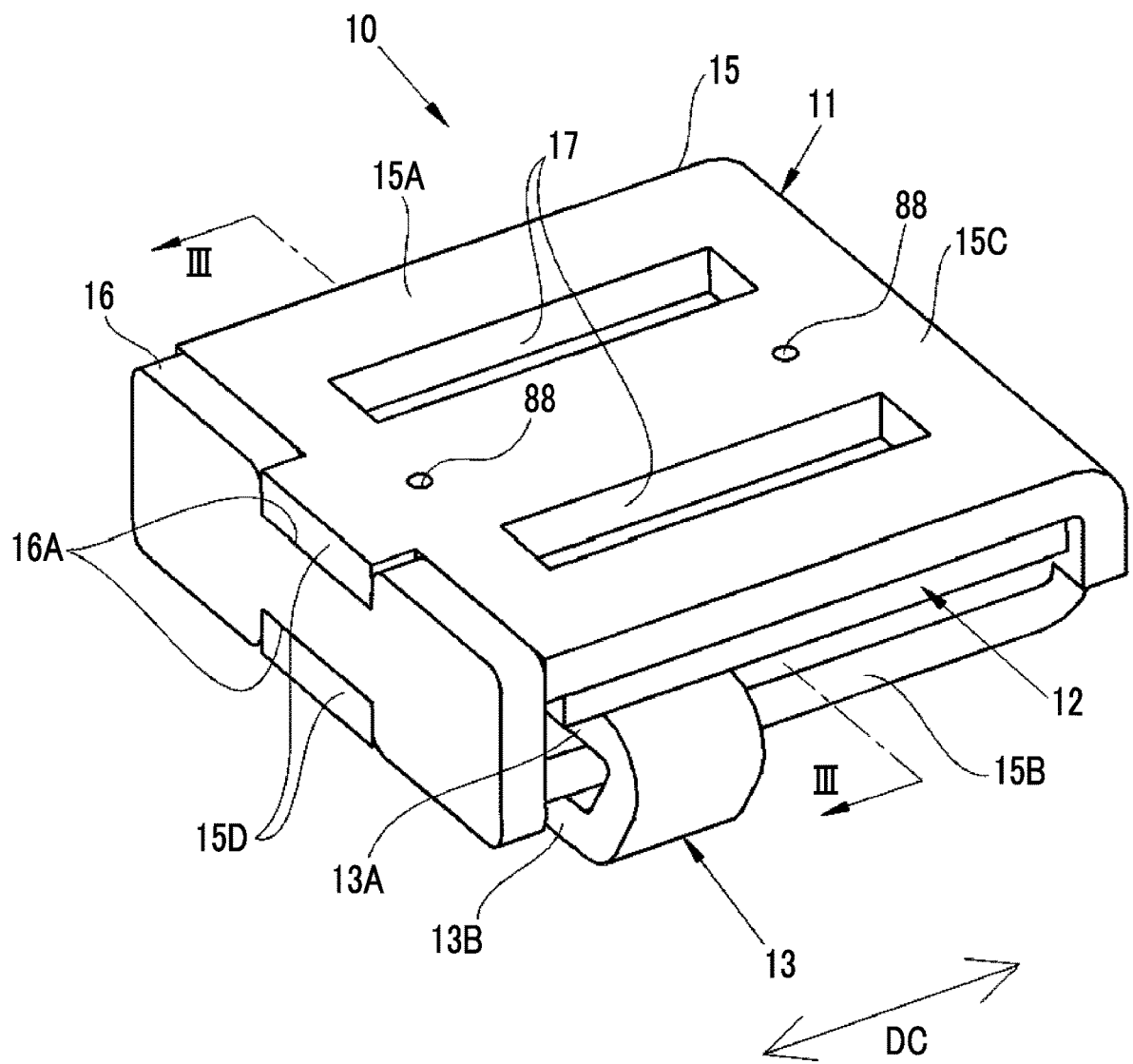
FIG. 1 is a perspective view of a voice coil motor.
Figure 2:
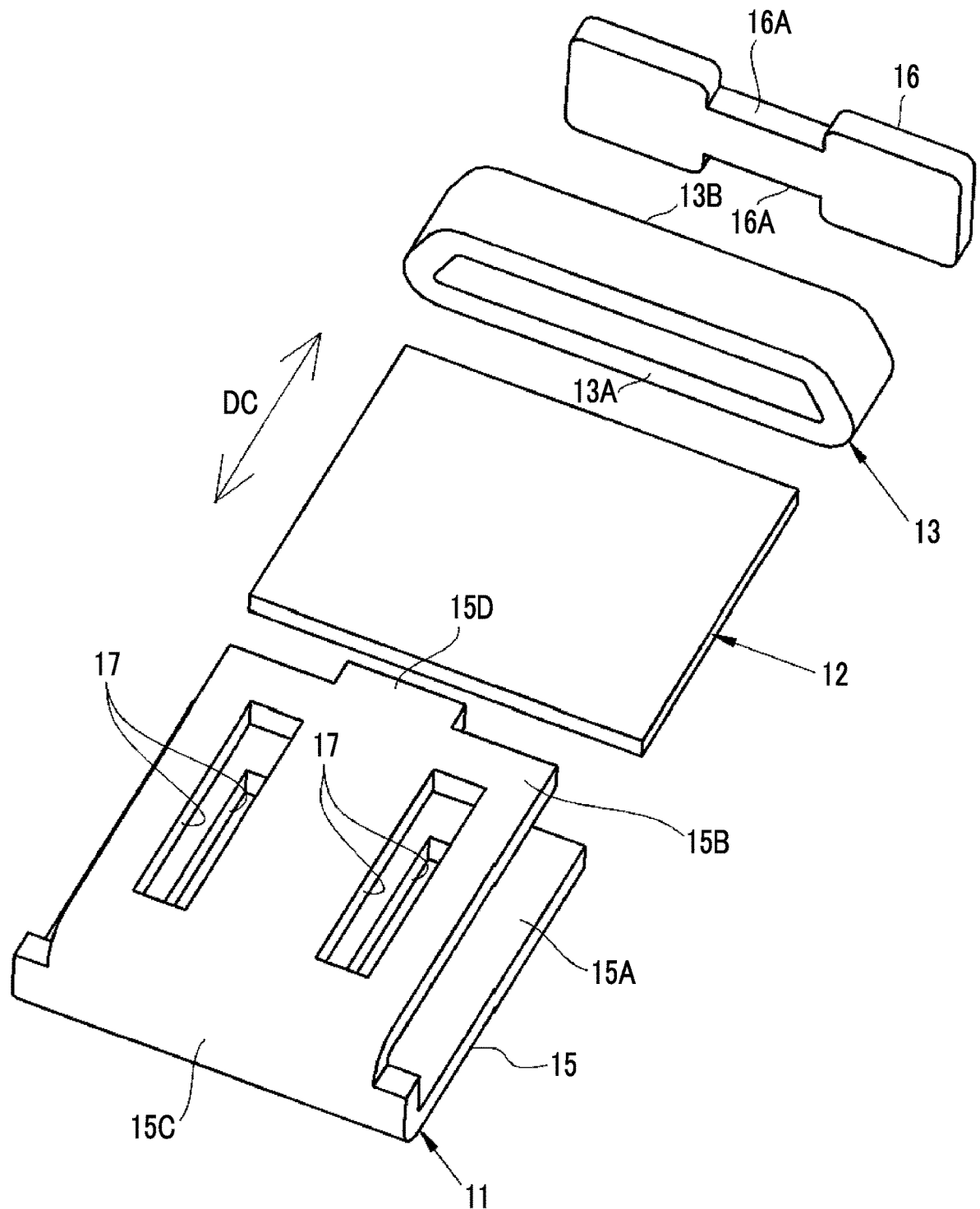
FIG. 2 is an exploded perspective view of the voice coil motor that is viewed from the back.

As shown in FIGS. 1 and 2, a voice coil motor (hereinafter, simply referred to as a VCM) 10 of the invention comprises a yoke 11, a magnet 12, and a coil 13. The yoke 11 is made of a magnetic material, such as iron, and includes a yoke body 15 and a connecting plate 16. The yoke body 15 has a structure in which an outer yoke 15A and an inner yoke 15B face each other in parallel to each other with a gap therebetween and are connected to each other by a connecting portion 15C, and is formed in a U shape in a case in which the yoke body 15 is viewed from the side. Fitting-protruding pieces 15D are formed at end portions of the outer yoke 15A and the inner yoke 15B opposite to the connecting portion 15C. A fitting groove 16A is formed in the middle of each of an upper side portion and a lower side portion of the connecting plate 16. The fitting-protruding pieces 15D of the yoke body 15 are fitted to the fitting grooves 16A, so that the yoke body 15 and the connecting plate 16 are connected to each other. The outer yoke 15A and the inner yoke 15B are connected to each other by the connecting portion 15C and the connecting plate 16, so that a magnetic circuit of a closed loop is formed. A magnetic flux, which crosses the coil 13, can be increased by the magnetic circuit of the closed loop.

Figure 3:
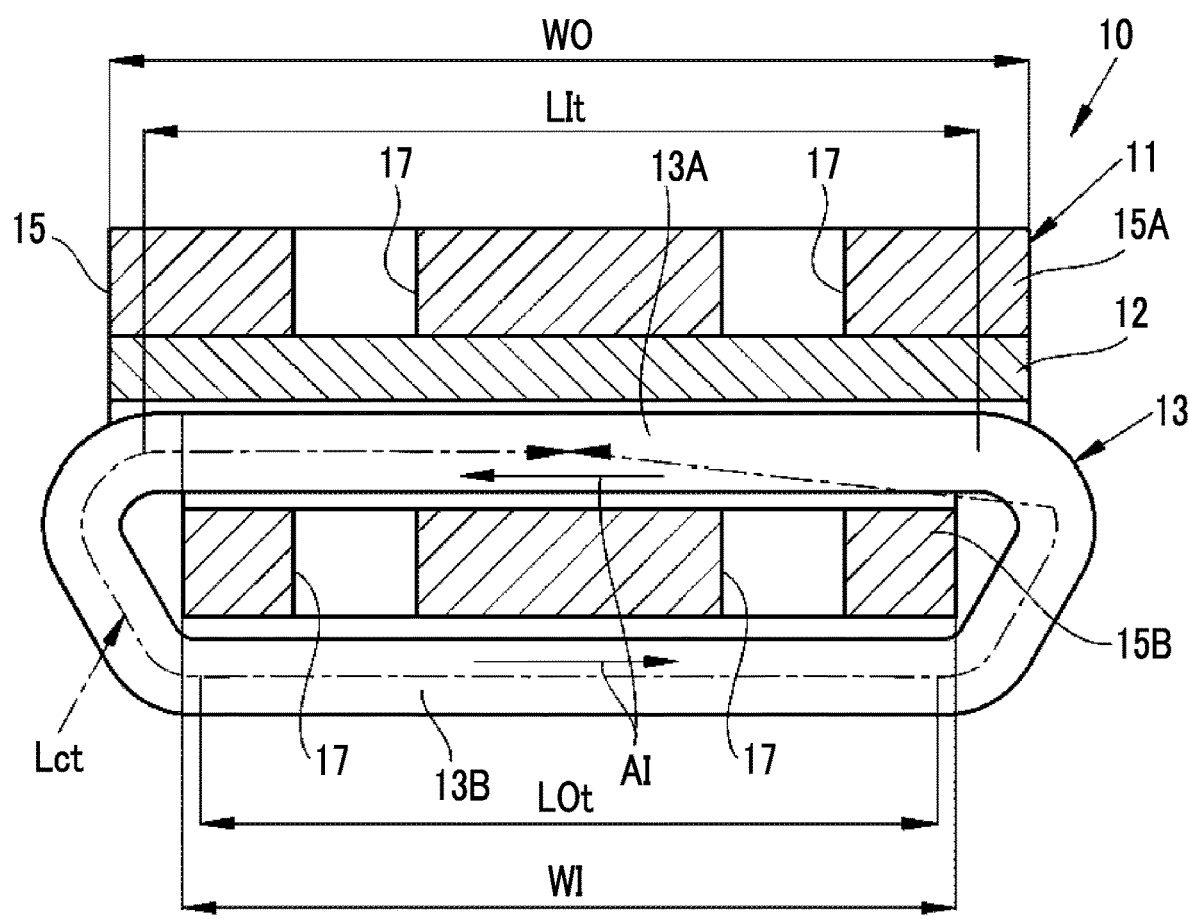
FIG. 3 is a cross-sectional view showing the circumferential length of a coil and taken along line III-III of FIG. 1.

As shown in FIG. 3, the outer yoke 15A functions as a magnet holding portion and the inner yoke 15B functions as a coil insertion portion. The magnet 12 is fixed to the inner surface of the outer yoke 15A. Further, the inner yoke 15B is inserted into the coil 13 so that the coil 13 is movable.

Each of the outer and inner yokes 15A and 15B includes openings 17 for reducing weight. Each of the openings 17 is formed of a rectangular slit that is long in the moving direction DC of the coil 13 (hereinafter, referred to as a coil-moving direction). A plurality of, for example, two openings 17 are arranged side by side in a direction orthogonal to the coil-moving direction DC. The openings 17 of the inner yoke 15B are formed at positions that face the openings 17 of the outer yoke 15A.

The width WI of the inner yoke 15B is smaller than the width WO of the outer yoke 15A (the length of the outer yoke 15A in the direction orthogonal to the coil-moving direction DC). The inner surfaces of the outer and inner yokes 15A and 15B are surfaces where the outer and inner yokes 15A and 15B face each other. Further, the outer surface is a surface that is positioned on the outside opposite to the inner surface.

The coil 13 is an air core coil that is formed by the winding of a strand, such as a copper wire. The coil 13 is formed in a trapezoidal shape so as to surround the inner yoke 15B. More specifically, since the length (outer wire length) LOt of a long side (outer long side) 13B along the outer surface of the inner yoke 15B is shorter than the length (inner wire length) LIt of a long side (inner long side) 13A along the inner surface of the inner yoke 15B (LIt>LOt), the coil 13 is formed in a trapezoidal shape.

Figure 4:
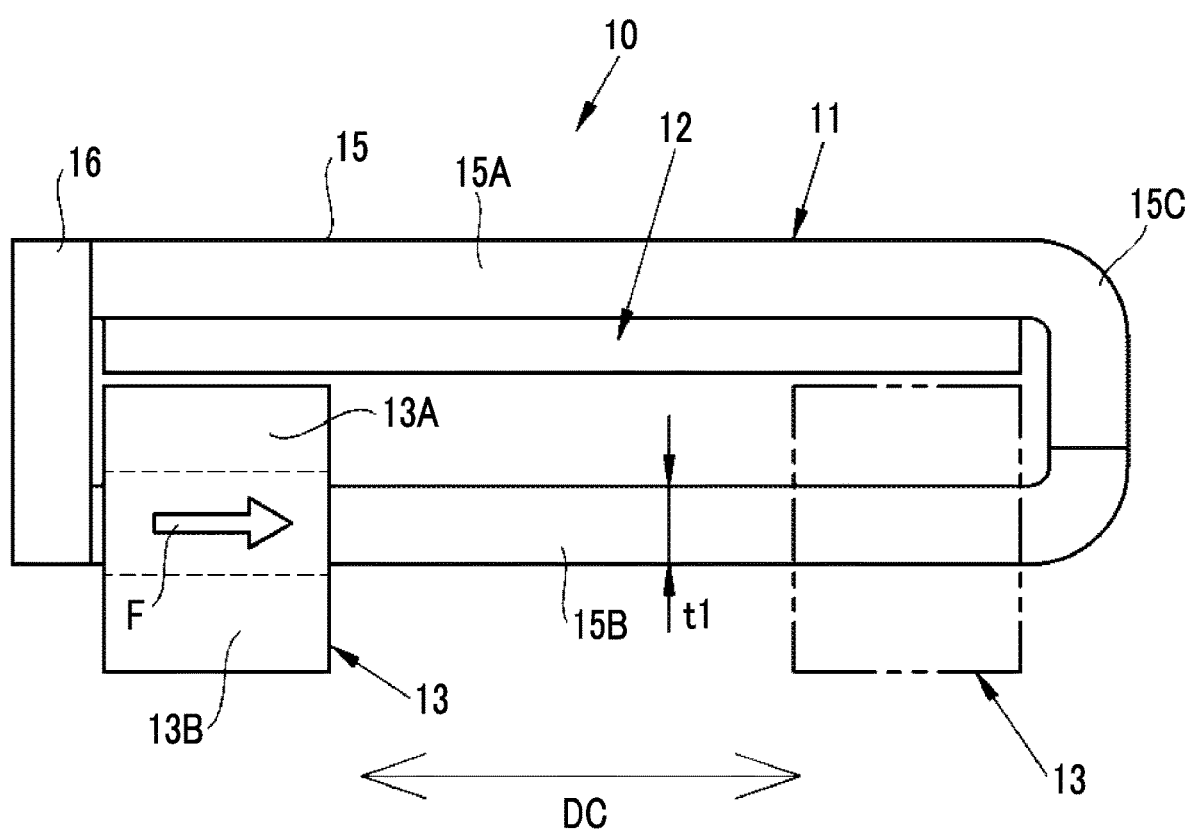
FIG. 4 is a side view of the voice coil motor.

As shown in FIG. 4, the coil 13 is moved along the inner yoke 15B in a magnetic field, which is generated by the magnet 12, by the application of current. The position of the coil 13, which is shown by a solid line and is close to the connecting plate 16, is a start position of movement positions of the coil 13, and the position of the coil 13, which is shown by a two-dot chain line and is close to the connecting portion 15C, is a terminal position of the movement positions of the coil 13. Further, a position, which corresponds to a middle point between the start position and the terminal position, is a middle position of the movement positions of the coil 13, and the start position and the terminal position are both end positions of the movement positions of the coil 13. The openings 17 are formed toward the both end positions from the middle position of the coil 13.

A thrust F [N] applied to the coil 13 is obtained from "$F=I \cdot B \cdot WO$" in a case in which the value of current of the coil 13 is denoted by I [A], magnetic flux density is denoted by B [T], and the width of the magnet 12 is denoted by WO. In this case, in a case in which the magnet 12 and the coil 13 are formed to have the same structure and the value I of current flowing in the coil 13 is set to be the same value, the thrust F is determined depending on an integrated value of magnetic flux density distribution in the direction (the width direction of the magnet 12) orthogonal to the coil-moving direction DC. The integrated value of magnetic flux density distribution is obtained from the area of magnetic flux density distribution of the graph of FIG. 5.

Figure 5:
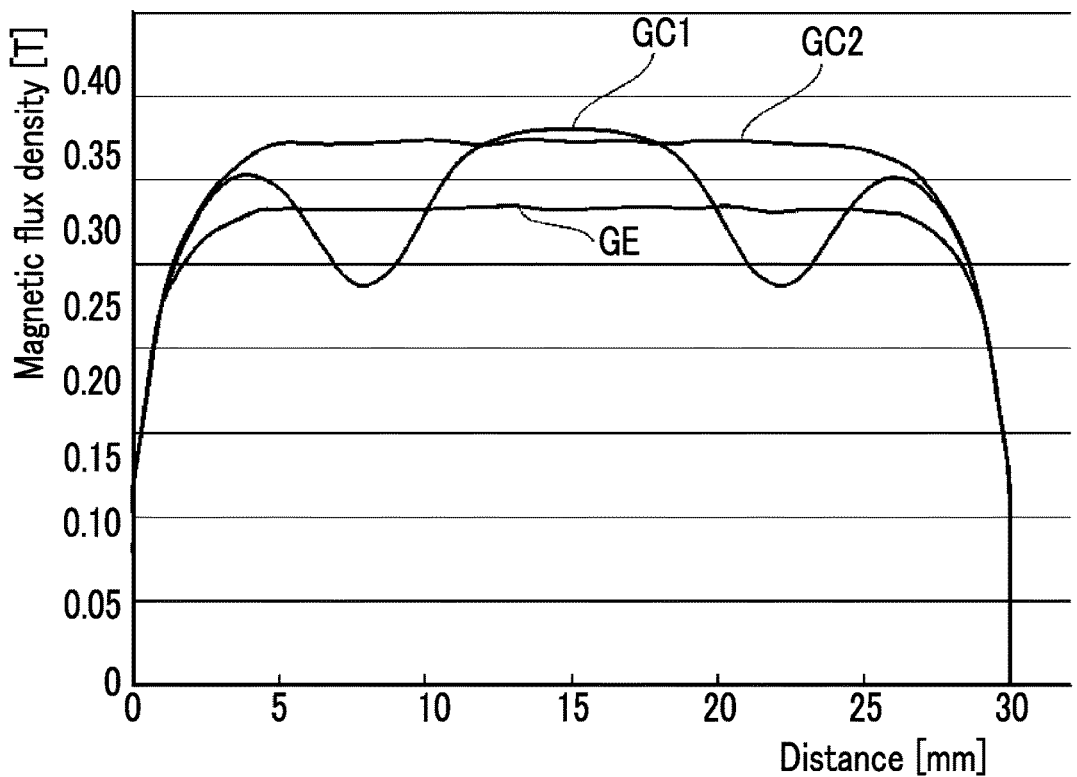
FIG. 5 is a graph showing magnetic flux density distribution in a direction orthogonal to a coil-moving direction at a start position and a middle position of the coil.

FIG. 5 is a graph showing magnetic flux density distribution in the direction orthogonal to the coil-moving direction DC. A horizontal axis represents a position (distance) [mm] in the width direction of the magnet 12, and a vertical axis represents magnetic flux density [T]. A curve GE represents magnetic flux density distribution at the start position, a curve GC1 represents magnetic flux density distribution at the middle position, and a curve GC2 represents magnetic flux density distribution at the middle position in a case in which the openings 17 are not formed. It is found from the curve GC1 that magnetic flux density distribution at portions corresponding to the openings 17 are lower than that at other portions due to the openings 17.

Figure 6:
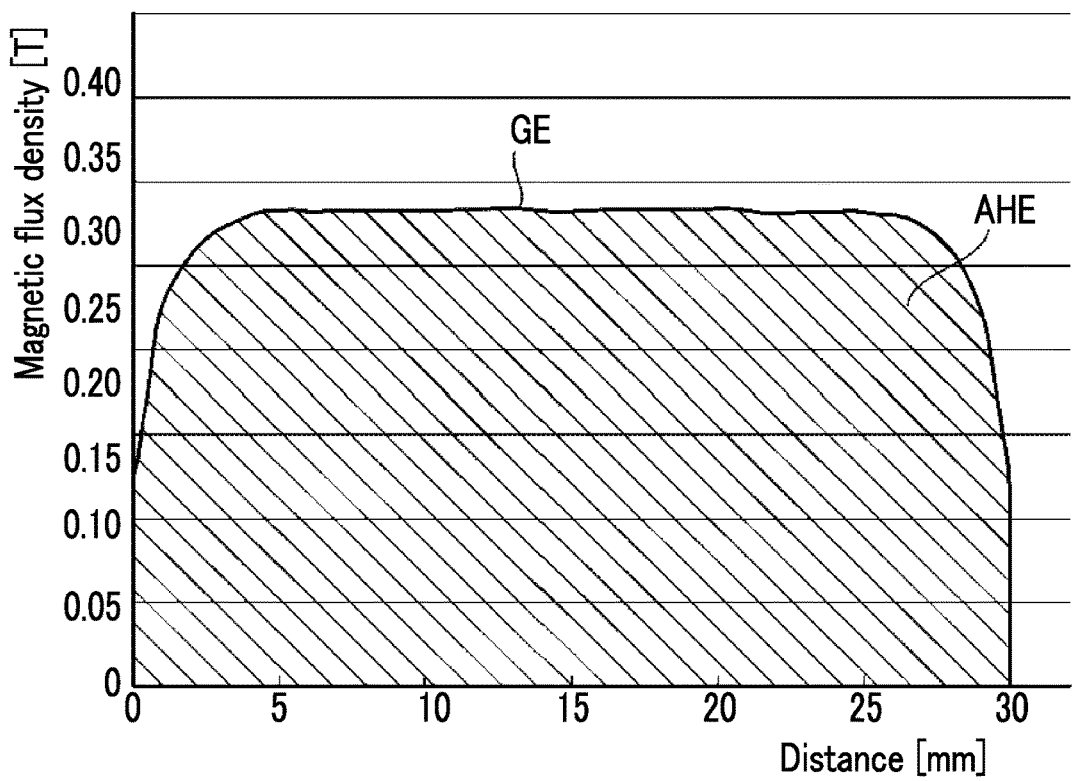
FIG. 6 is a graph showing an integrated value of magnetic flux density distribution in the direction, which is orthogonal to the coil-moving direction, at the start position of the coil by hatching.
Figure 7:
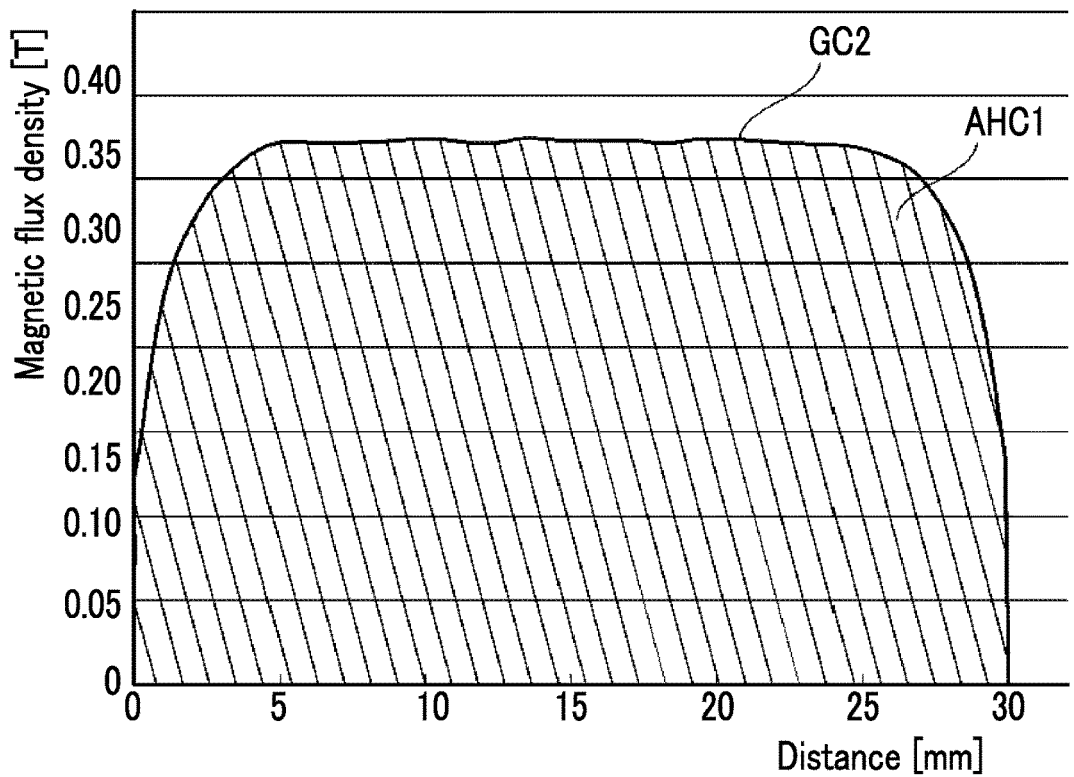
FIG. 7 is a graph showing an integrated value of magnetic flux density distribution in the direction, which is orthogonal to the coil-moving direction, at the middle position of the coil in a case in which openings are not formed by hatching.
Figure 8:
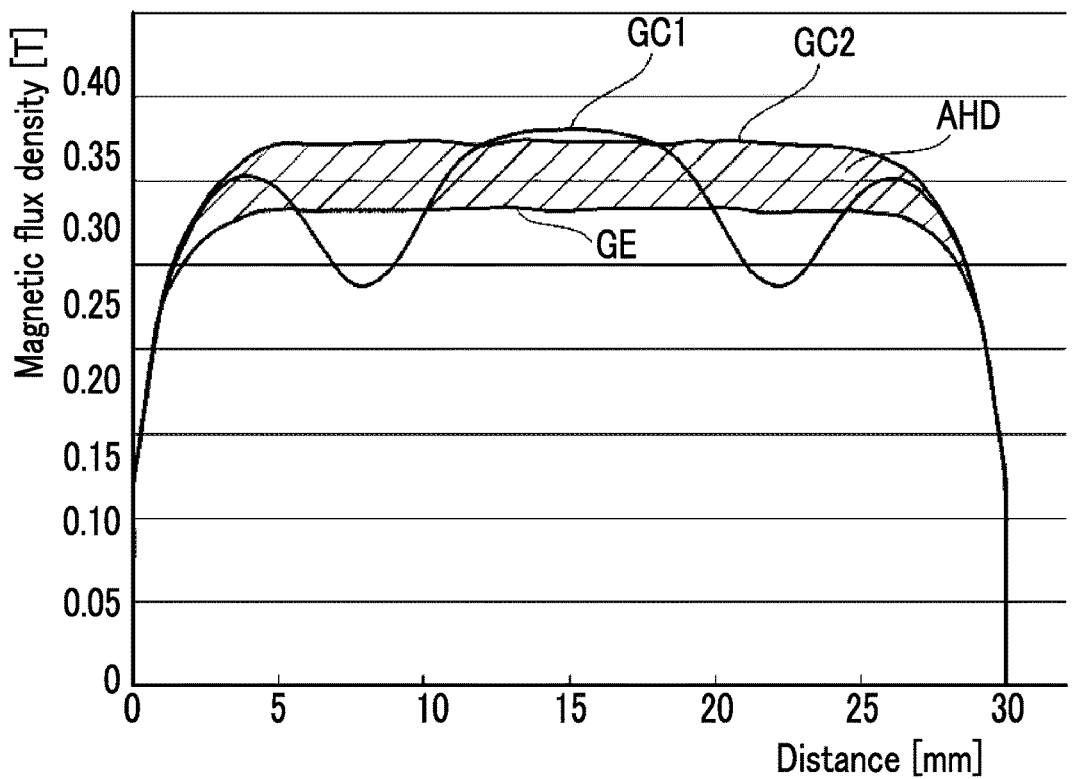
FIG. 8 is a graph showing an integrated value of extra magnetic flux density distribution at the middle position of the coil by hatching.

An integrated value (hatched region AHE) of magnetic flux density distribution at the start position, which is represented by the curve GE and shown in FIG. 6, is smaller than an integrated value (hatched region AHC1) of magnetic flux density distribution at the middle position in a case in which the openings 17 are not formed that is represented by the curve GC2 and shown in FIG. 7. Accordingly, a thrust Fe of the coil 13 at the start position is smaller than a thrust Fc of the coil 13 at the middle position. Since a necessary thrust Fb (see FIG. 10) needs to be obtained on the basis of the start position or the terminal position where the thrust F of the coil 13 is smallest, magnetic flux density distribution, which is represented by a difference region AHD (corresponding to a difference integrated value, see FIG. 8) obtained by subtracting the hatched region AHE shown in FIG. 6 from the hatched region AHC1 shown in FIG. 7, is an extra.

Figure 9:
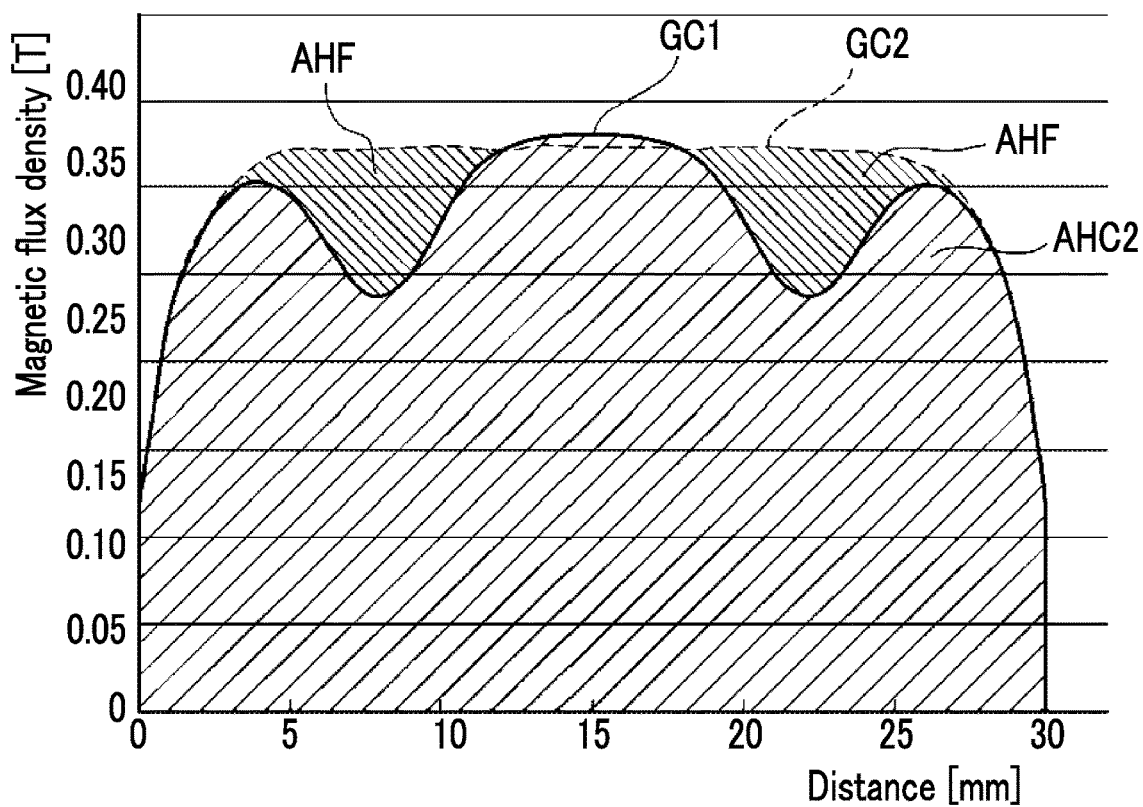
FIG. 9 is a graph showing a reduction in magnetic flux density distribution caused by openings and showing the integrated value of magnetic flux density distribution at the middle position of the coil by hatching.

In a case in which the openings 17 are formed in the yoke body 15 to reduce an integrated value (the area of a hatched region AHC2) of magnetic flux density distribution in the range of extra magnetic flux density distribution as represented by a curve GC1 of FIG. 9, a necessary thrust is obtained and weight is reduced due to the openings 17. Accordingly, the openings 17 can be formed in a range where a necessary thrust is obtained. That is, in a case in which an opening width Hx (see FIG. 11), which is the length of the opening 17 in the direction orthogonal to the coil-moving direction DC, is determined so that the integrated value (the area of the hatched region AHC2) of magnetic flux density distribution at the middle position in a state in which magnetic flux density distribution is reduced due to the openings 17 is equal to the integrated value (the area of the hatched region AHE) of magnetic flux density distribution at the start position where the openings 17 are not formed, the thrust Fe at the start position and the thrust Fc at the middle position are equal to each other. Accordingly, a necessary thrust can be ensured while the yoke 11 is reduced in weight due to the openings 17. Instead of this, the opening width Hx may be determined so that a difference integrated value (the area of the hatched region AHD), which is obtained by subtracting the integrated value (the area of the hatched region AHE) of magnetic flux density distribution at the start position from the integrated value (the area of the hatched region AHC2) of magnetic flux density distribution at the middle position, is equal to an integrated value (a hatched region AHF, see FIG. 9) of a reduction in magnetic flux density distribution caused by the openings 17.

Figure 10:
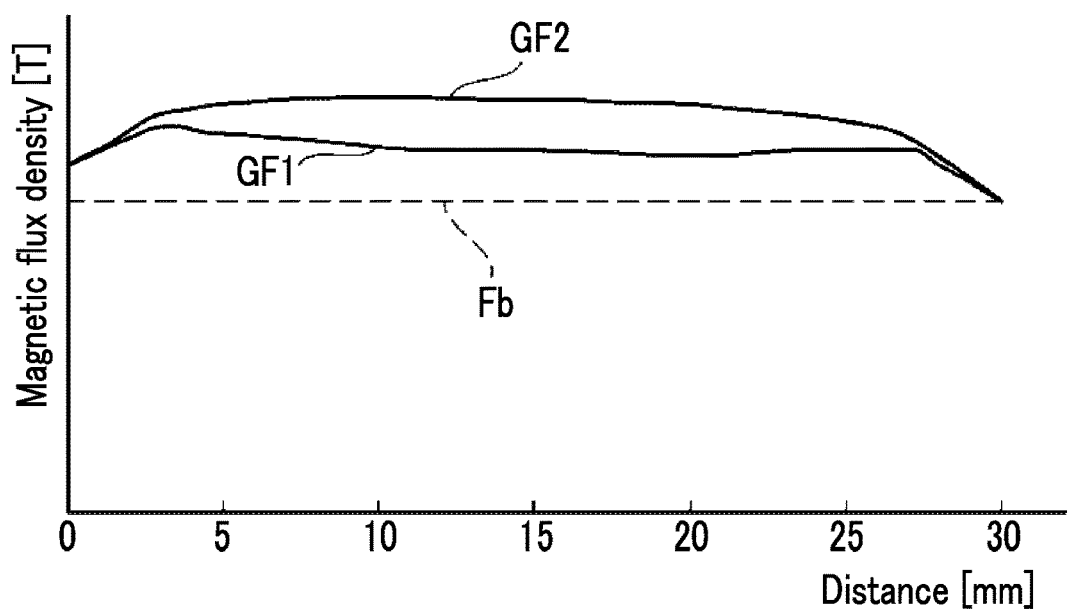
FIG. 10 is a graph showing the distribution of a thrust, which is applied to the coil, in the coil-moving direction.

GF1 shown in FIG. 10 represents the distribution of a thrust applied to the coil 13 in the coil-moving direction DC that is obtained in this way. GF2 represents the distribution of a thrust applied to the coil 13 in a case in which a yoke (not shown) in which the openings 17 are not faulted is used. A thrust is further reduced near the middle position by as much as a reduction in magnetic flux density caused by openings 17 in GF1 of this embodiment than in GF2 where the yoke in which the openings 17 are not formed is used. However, since the necessary thrust Fb can be ensured, there is no practical problem. Moreover, the weight of the yoke body 15 can be reduced by as much as the weight of the openings 17 to be formed. A horizontal axis of the graph of FIG. 10 represents the movement positions (Distance) [mm] of the coil 13 in the coil-moving direction DC, 0 represents the start position, and 30 represents the terminal position.

Figure 11:
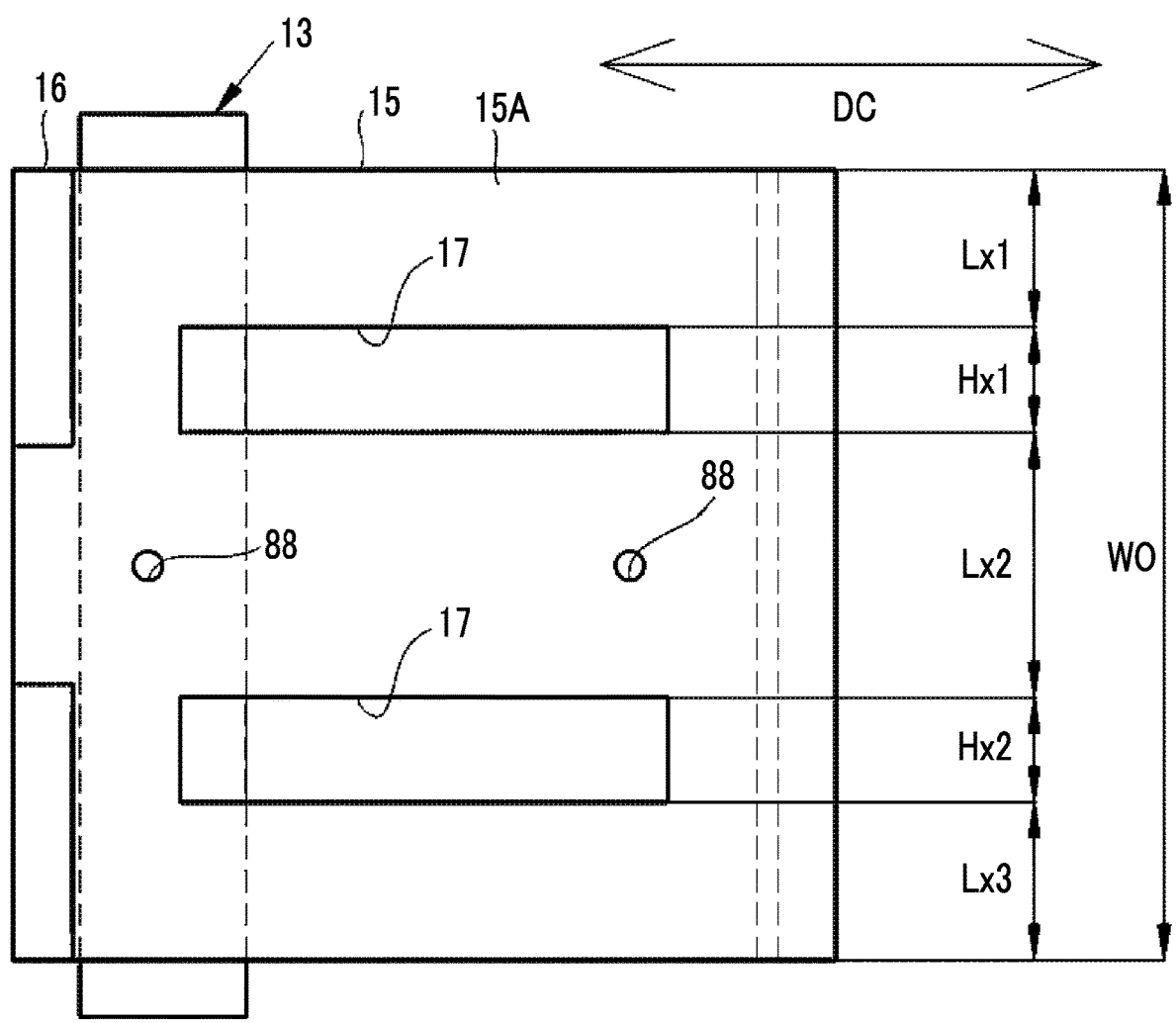
FIG. 11 is a plan view showing the dimensions of the respective portions of the openings that are required to obtain shape conditions of the openings.

Next, a method of more simply setting the shape conditions of the openings 17, which are necessary to reduce weight while ensuring a practical thrust Fb, will be described. In a case in which the shape conditions of the openings 17 are obtained on the basis of the thickness t1 (see FIG. 4) of the yoke body 15 (inner yoke 15B) and the width WO of the yoke body 15 (outer yoke 15A) as shown in FIG. 11, the shape conditions are as follows. In a case in which a total width, which is the sum of the lengths of the openings 17 in the direction orthogonal to the coil-moving direction DC, is denoted by H (=H×1+H×2), a remaining width, which is obtained by subtracting the total width H of the openings 17 from the width WO, is denoted by NH (=WO−H=L×1+L×2+L×3), the thickness of the yoke body 15 is denoted by t1, and the width of the yoke body 15 is denoted by WO, Conditional expressions (1) and (2) need to be satisfied.

$$H \geq t1 \text{ and } NH \geq t1 \quad (1)$$

$$(WO/2) \geq H \quad (2)$$

In a case in which Conditional expression (1) is not satisfied, the strength of the yoke body 15 is insufficient or it is difficult to machine the yoke body 15. Further, in a case in which Conditional expression (2) is not satisfied, there is a possibility that the necessary thrust Fb cannot be obtained due to a large reduction in a thrust even though being roughly estimated.

Since the openings 17 are formed toward both end positions of the yoke body 15 from the middle position of the movement positions of the coil 13 as described above, thrust distribution in the coil-moving direction DC at the middle position is substantially equal to that at the both end positions (the start position and the terminal position) as shown in FIG. 10. Accordingly, thrust distribution can be made substantially constant in the coil-moving direction DC. Since the openings 17 are formed in the outer and inner yokes 15A and 15B so that an excessive thrust is reduced as described above, the volume of the yoke 11 made of a material, such as iron having a high specific gravity, can be reduced. Accordingly, the VCM 10 can be made light. Moreover, the necessary thrust Fb can be ensured.

Figure 12:
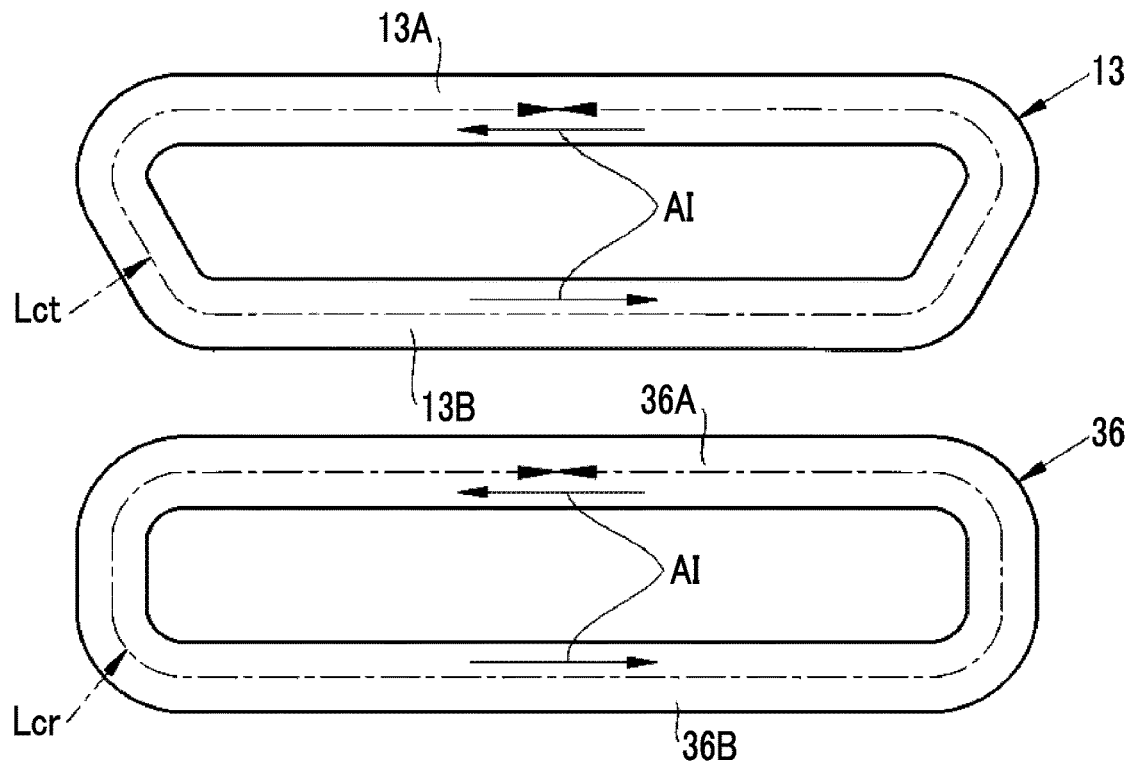
FIG. 12 is a front view comparing and showing a trapezoidal coil and a rectangular coil.

FIG. 12 is a front view of the trapezoidal coil 13 of this embodiment and a rectangular coil 36 as Comparative example that are arranged side by side. Since an outer long side 13B is shorter than an inner long side 13A in the trapezoidal coil 13 unlike in the rectangular coil 36, the circumferential length Lct of a coil 13 is made shorter than the circumferential length Lcr of the rectangular coil 36 of which the length of each of the inner long side 36A and the outer long side 36B is equal to the length of the inner long side 13A.

In a case in which current flows in the coils 13 and 36 as shown by arrows AI, the coils 13 and 36 are moved by thrusts mainly acting on the inner long sides 13A and 36A of the coils 13 and 36. However, since current also flows in the outer long sides 13B and 36B in a direction opposite to the direction of current flowing in the inner long sides 13A and 36A, thrusts of which the directions are opposite to the directions of the thrusts acting on the inner long sides 13A and 36A act on the outer long sides 13B and 36B and these cause thrusts to be reduced. Since the coil 13 is formed in a trapezoidal shape and the outer long side 13B is formed to be shorter than the inner long side 13A in this embodiment, an opposite thrust acting on the outer long side 13B can be reduced by as much as the reduced length of the outer long side 13B. Moreover, since the circumferential length Lct is made shorter than the circumferential length Lcr, the coil 13 can be made lighter than the coil 36. Accordingly, a thrust can be increased while the coil 13 is made light.

In a case in which the above comparison will be described with reference to a calculation equation, the followings will be made. In a case in which magnetic flux density at the outer long side 13B is denoted by BO, magnetic flux density at the inner long side 13A is denoted by BI, the wire length of the outer long side 13B is denoted by LO, and the wire length of the inner long side 13A is denoted by LI, the direction of a thrust applied to the inner long side 13A is opposite to the direction of a thrust applied to the outer long side 13B. Accordingly, in a case in which a thrust Ft applied to the trapezoidal coil 13 is expressed by an equation, the equation is as follows.

$$Ft = I \cdot BI \cdot LI - I \cdot BO \cdot LO$$

Therefore, a thrust can be further increased by as much as a reduction in an opposite thrust ($-I \cdot BO \cdot LO$) in the VCM 10 of this embodiment than that in a VCM 37 (a fourth modification example: see FIG. 17) including the rectangular coil 36.

The driving voltage, the diameter of a strand of the coil 13, the number of times of winding of the strand, and the sizes of the magnet 12 and the outer yoke 15A of the VCM 10 are set to be equal to the driving voltage, the diameter of a strand of the coil 36, the number of times of winding of the strand, and the sizes of the magnet 12 and the outer yoke 35A (see FIG. 17) of the VCM 37; and other conditions except for the shape of the coil are set to the same conditions. In a case in which thrusts applied to the VCMs 10 and 37 are obtained under the conditions, the thrusts are as shown in FIG. 13.

Figure 13:
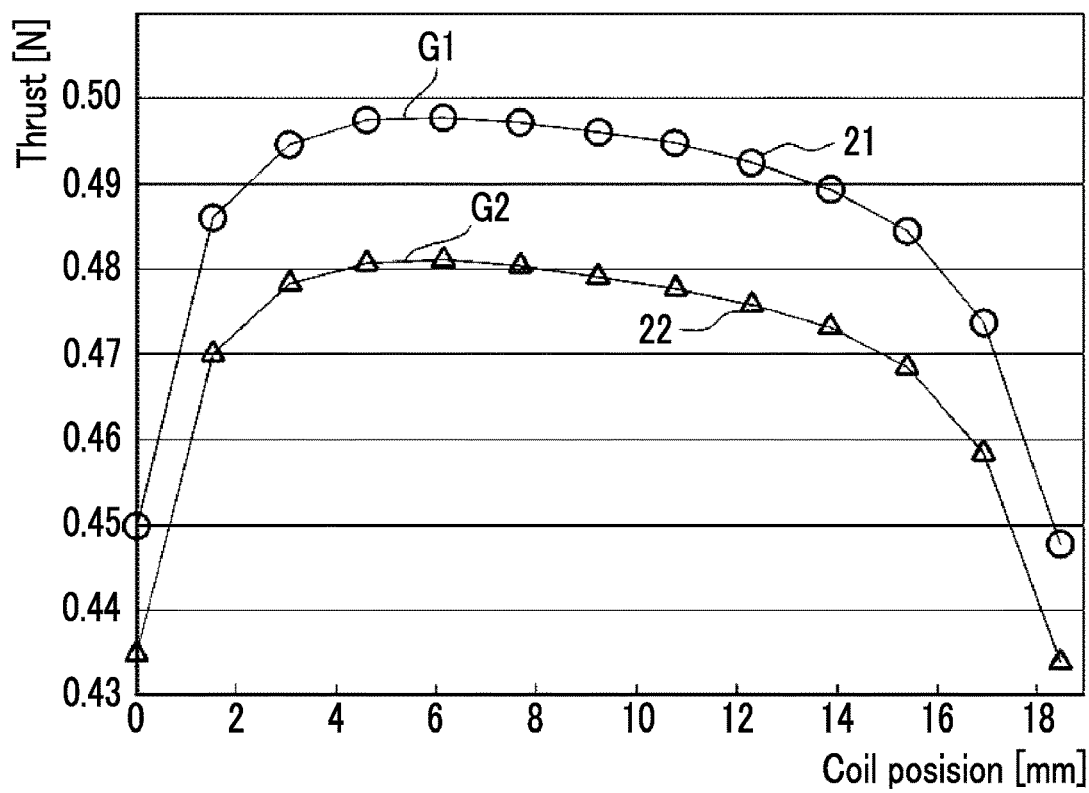
FIG. 13 is a graph showing the thrust distribution of a voice coil motor using the trapezoidal coil and the thrust distribution of a voice coil motor using a rectangular coil.
Figure 17:
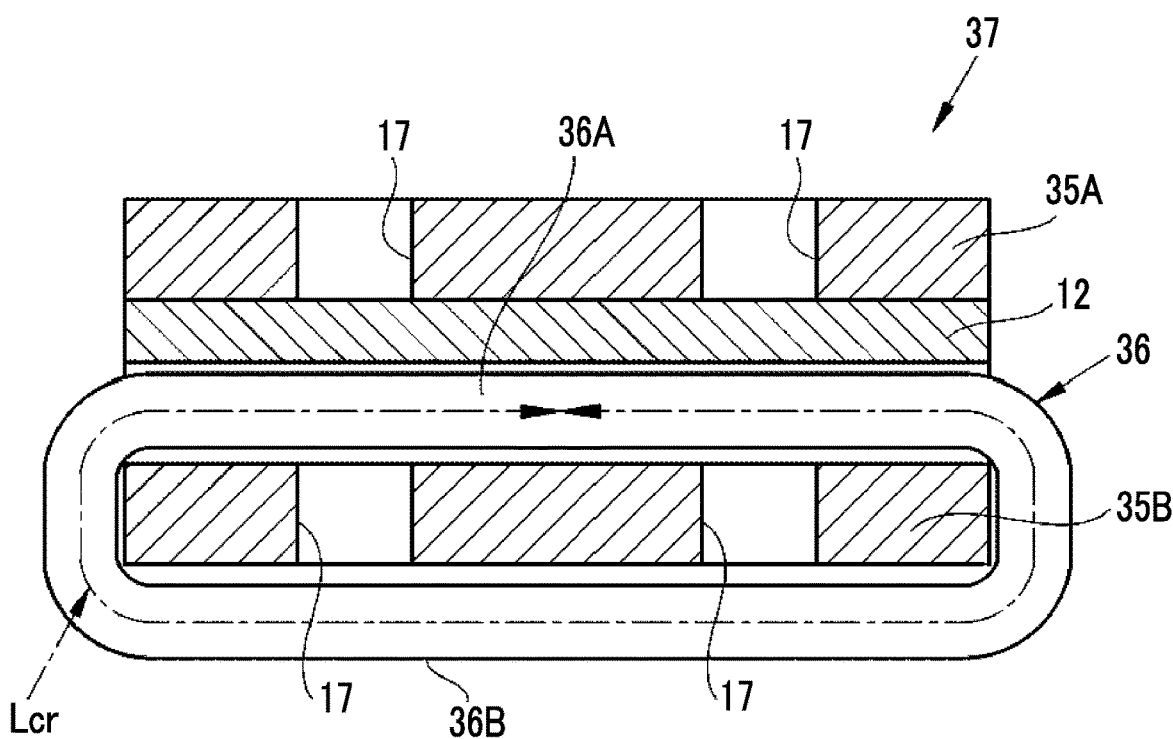
FIG. 17 is a cross-sectional view showing a voice coil motor of a fourth modification example and corresponding to line of FIG. 1.

FIG. 13 shows the thrust distribution of the VCM 10 using the trapezoidal coil 13 and the thrust distribution of the VCM 37 using the rectangular coil 36. A horizontal axis represents the positions (Coil positions) [mm] of the coils 13 and 36 of the inner yokes 15B and 35B (see FIG. 17), and a vertical axis represents a thrust (Thrust) [N]. As shown in FIG. 4 by a solid line, the positions of the coils 13 and 36 are represented by a distance from a start position at which the coil 13 is positioned close to the connecting plate 16. A broken line G1, which connects thrust values shown by circular marks 21, represents the thrust distribution of the VCM 10 of this embodiment shown in FIG. 1 and the like. A broken line G2, which connects thrust values shown by triangular marks 22, represents the thrust distribution of the VCM 37 of the fourth modification example that uses the rectangular coil 36 and is shown in FIG. 17. It is found that a thrust at each coil position in this embodiment using the trapezoidal coil 13 is higher than that in the fourth modification example using the rectangular coil 36 by about 0.015 [N]. Moreover, the outer long side 13B is made shorter than the inner long side 13A (LIt>LOt) in this embodiment as shown in FIG. 12. Accordingly, the circumferential length Lct of the center line of the trapezoidal coil 13 can be made shorter than the circumferential length Lcr of the center line of the rectangular coil 36 (Lcr>Lct). Since the circumferential length is made short, the length of a strand of the coil 13 is also made short. For this reason, the weight of the coil 13 is reduced by as much as the reduced length of the strand of the coil 13.

Figure 14:
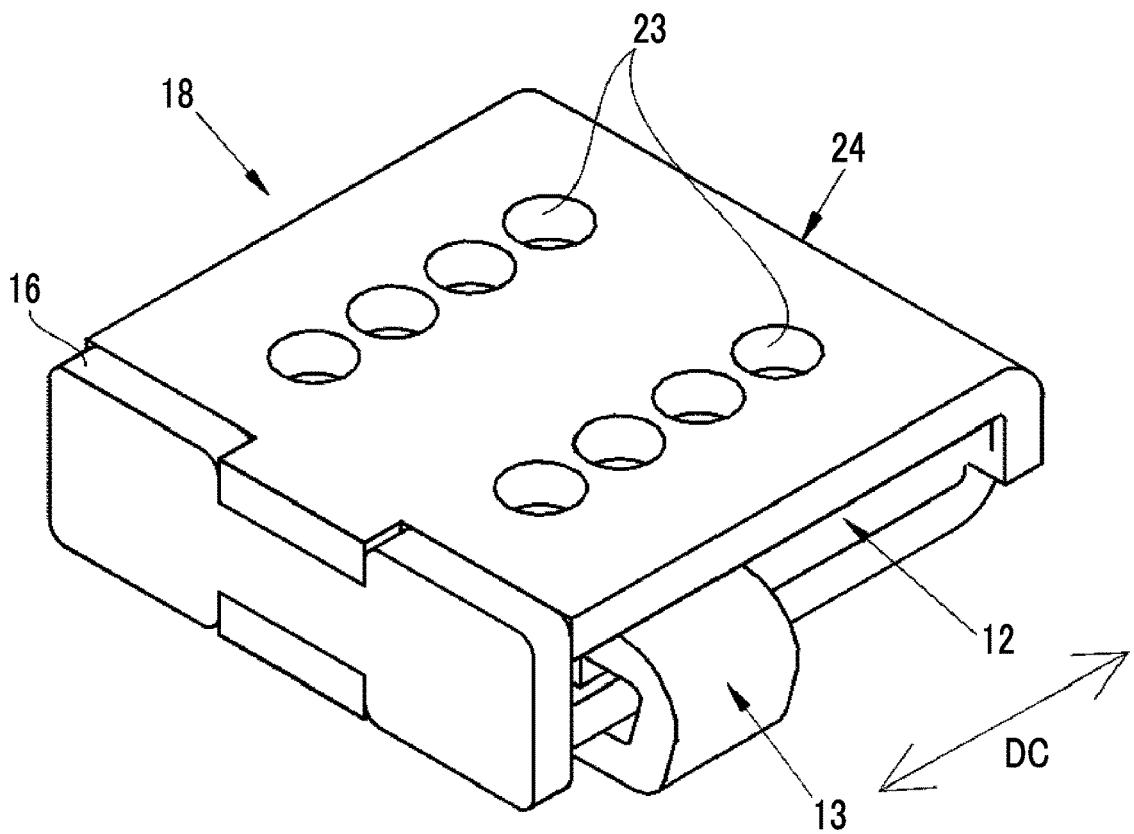
FIG. 14 is a perspective view of a voice coil motor of a first modification example that includes openings formed of a plurality of circular holes.

FIG. 14 shows an example in which openings are formed of a plurality of through-holes arranged in the coil-moving direction DC. That is, a VCM 18 shown in FIG. 14 includes a yoke body 24 of a first modification example that includes openings 23 formed of a plurality of circular holes arranged in the coil-moving direction DC instead of the slit-like openings 17. In other modification examples or other embodiments to be described below, the same components as those of the first embodiment will be denoted by the same reference numerals and the repeated description thereof will be omitted. The openings 23 have only to pass through the yoke body 24, and may have a shape other than a rectangular shape and a circular shape.

Figure 15:
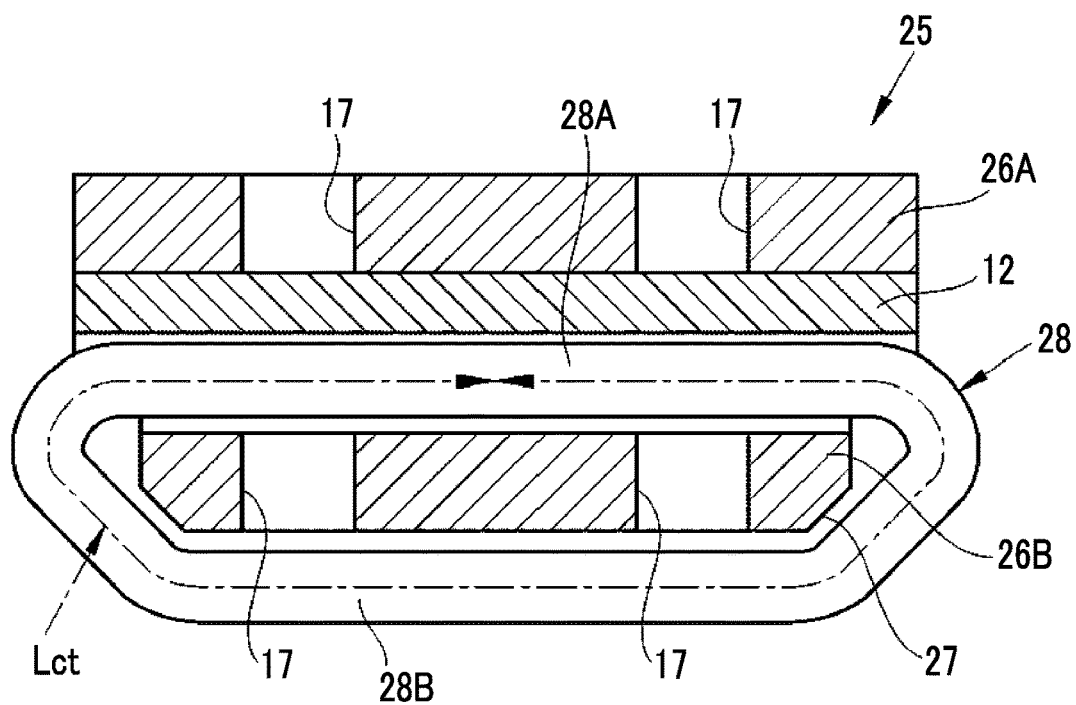
FIG. 15 is a cross-sectional view showing a voice coil motor of a second modification example and corresponding to line of FIG. 1.

FIG. 15 shows a VCM 25 of a second modification example of which the cross-sectional shape of an inner yoke 26B is changed. In the second modification example, the inner yoke 26B is formed to be narrower than an outer yoke 26A and both end portions of the outer surface of the inner yoke 26B are chamfered, so that inclined surfaces (chamfers) 27 are formed. Since the inclined surfaces 27 are formed as described above, an outer long side 28B of a trapezoidal coil 28 can be formed to be much shorter than an inner long side 28A. For this reason, an opposite thrust is further reduced by as much as the reduced length of the outer long side 28B and the coil 28 can be made light. Since the coil 28 can be formed in a trapezoidal shape even in the second modification example, a thrust can be increased while the weight of the coil 28 is reduced as in the first embodiment. Further, the outer and inner yokes 26A and 26B can be made light due to openings 17.

Figure 16:
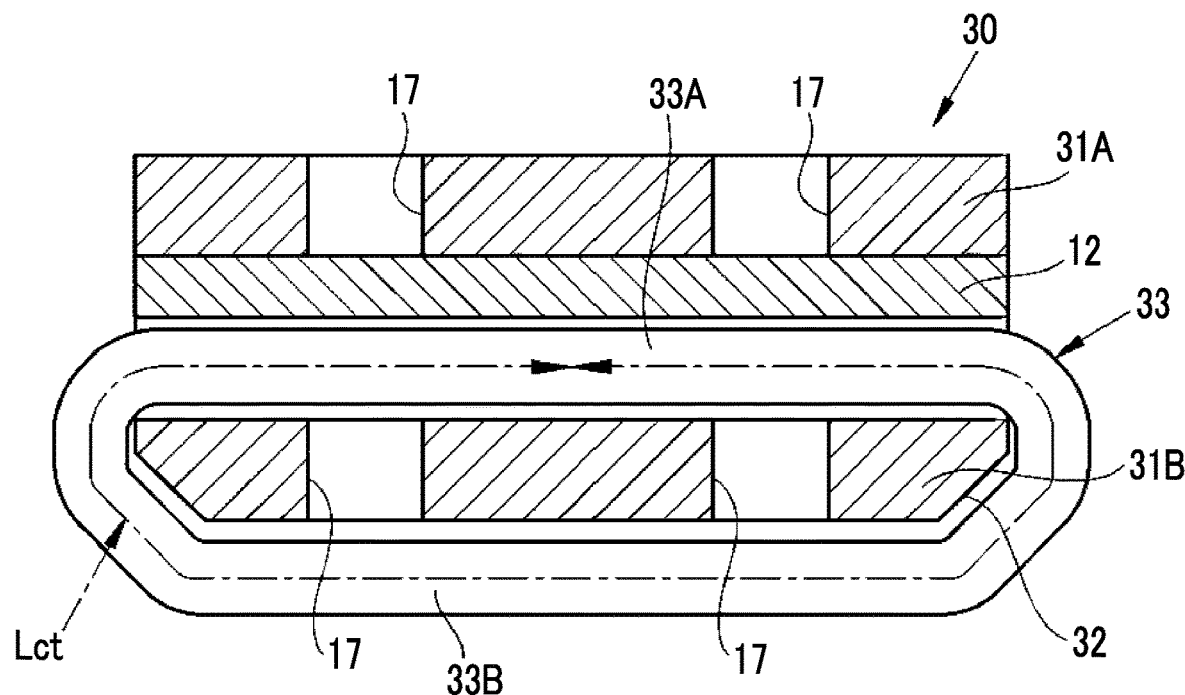
FIG. 16 is a cross-sectional view showing a voice coil motor of a third modification example and corresponding to line of FIG. 1.

FIG. 16 shows a VCM 30 of a third modification example. In this VCM 30, an outer yoke 31A and an inner yoke 31B are formed to have the same width in contrast to the VCM 10 of the first embodiment and inclined surfaces 32 are formed on the inner yoke 31B instead. Accordingly, since a coil 33 can be formed in a trapezoidal shape, weight can be reduced while a thrust can be increased. Further, the outer and inner yokes 31A and 31B can be made light due to openings 17.

FIG. 17 shows a VCM 37 of a fourth modification example of which an outer yoke 35A and an inner yoke 35B have the same width and which uses the rectangular coil 36 shown on the lower side in FIG. 12. In this case, openings 17 are formed in the outer and inner yokes 35A and 35B, so that the outer and inner yokes 35A and 35B can be made light while a necessary thrust is ensured.

Figure 18:
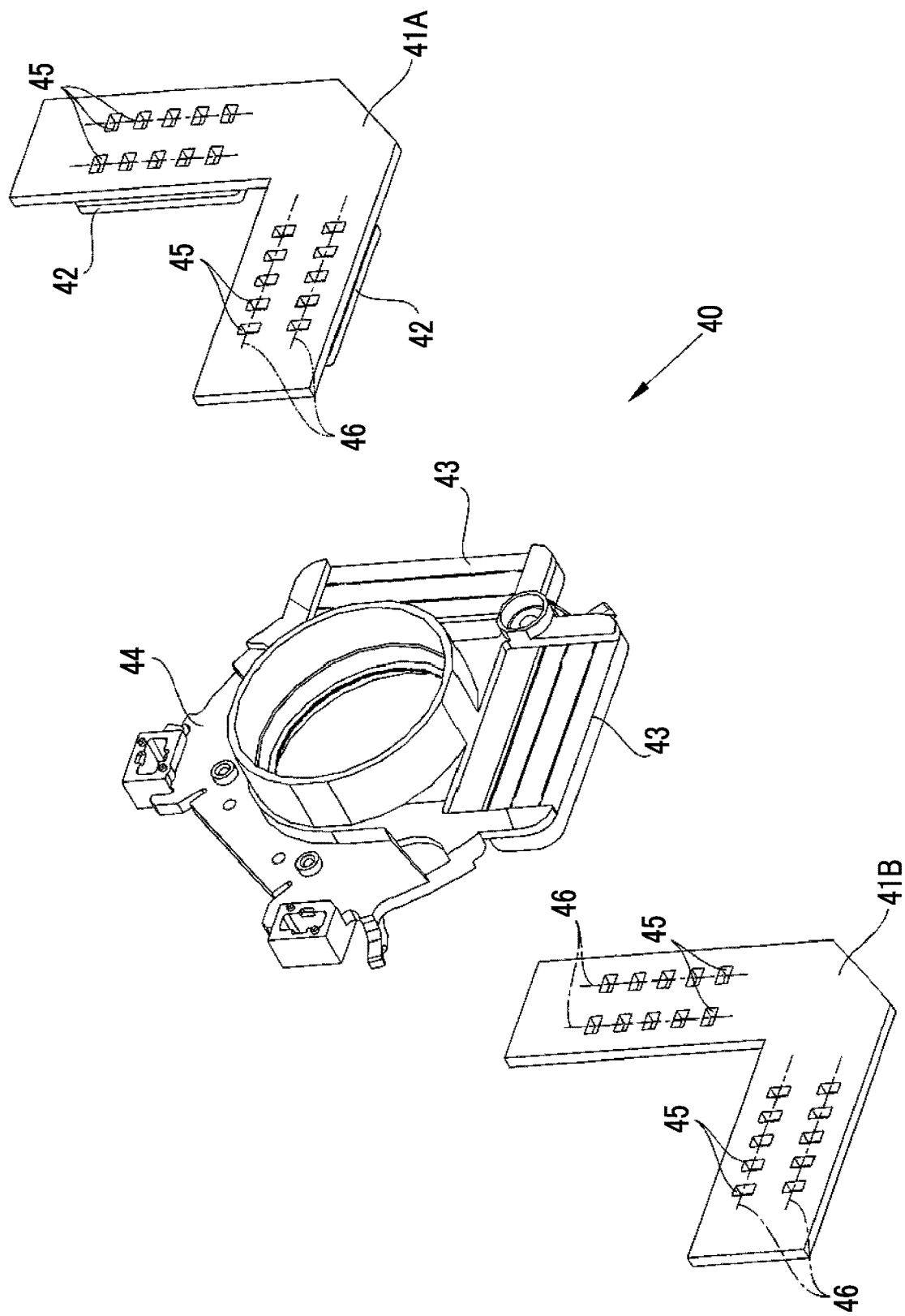
FIG. 18 is an exploded perspective view of a planar voice coil motor of a second embodiment that is viewed from the front side.
Figure 19:
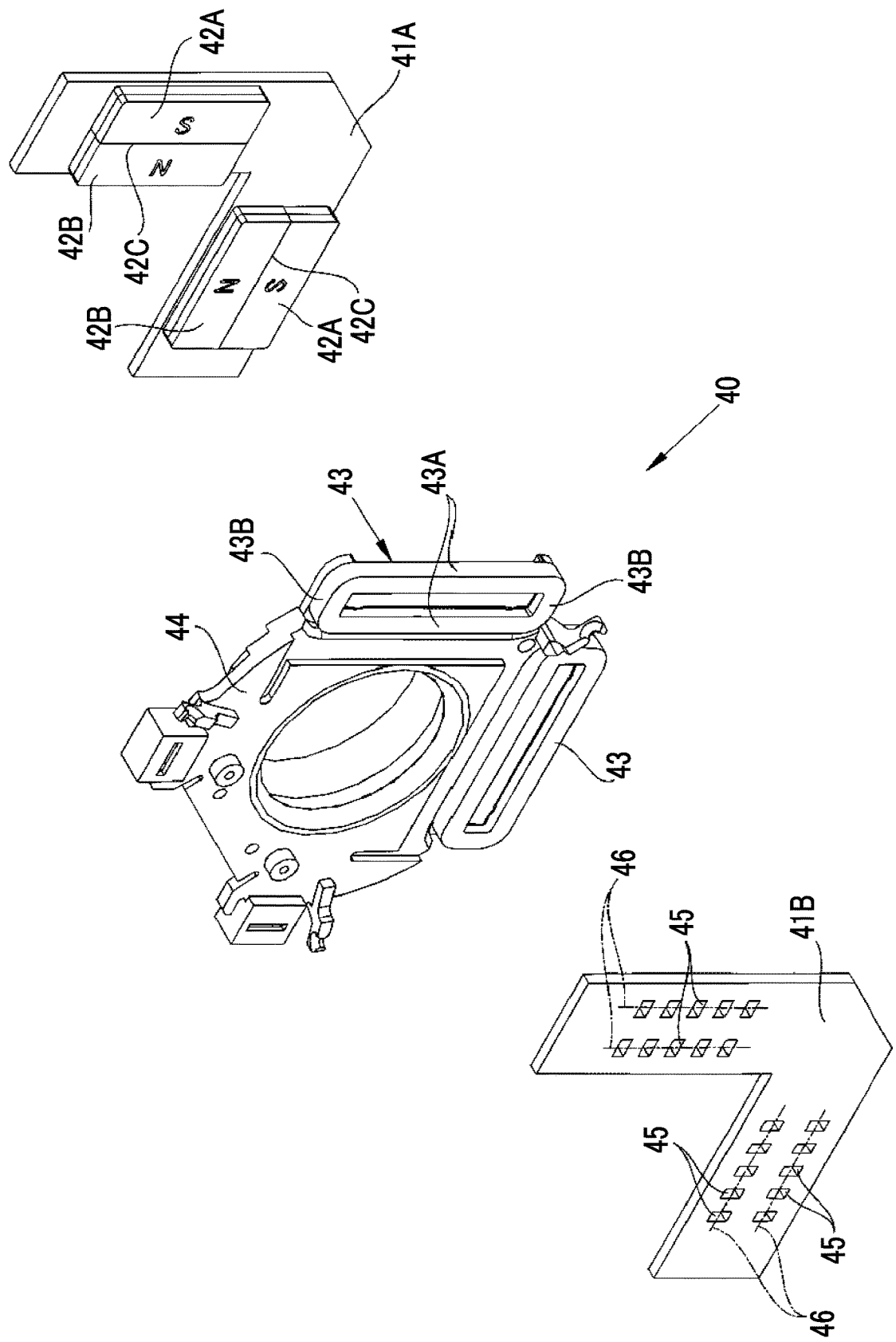
FIG. 19 is an exploded perspective view of the planar voice coil motor of the second embodiment that is viewed from the rear side.

Next, a second embodiment in which the invention is applied to a planar VCM will be described with reference to FIGS. 18 to 20. A VCM 40 is used in, for example, blur-correction for correcting the image blur of an imaging apparatus, such as a digital camera. In the VCM 40, two magnets 42 and two substantially rectangular planar coils 43 are provided between a pair of yokes 41A and 41B. One magnet 42 and one planar coil 43 form one planar VCM. That is, the VCM 40 has a structure in which two planar VCMs are made as one by L-shaped yokes 41A and 41B. Since the magnets 42 are mounted on the yoke 41A, the yoke 41A functions as a magnet holding portion. Further, the yoke 41B functions as a coil receiving portion. The planar coils 43 are movably disposed between the yoke 41B and the magnets 42. The planar coils 43 are fixed to, for example, a blur-correction frame 44 that is a member to be driven.

Figure 20:
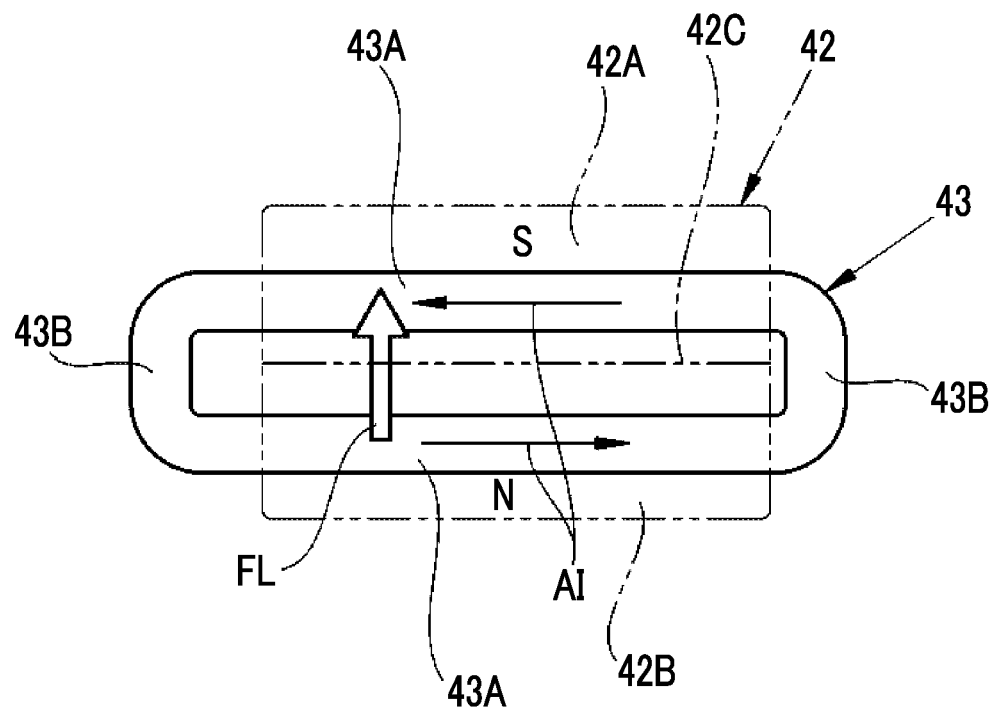
FIG. 20 is a plan view showing the movement of a coil of the second embodiment by a relationship between the coil and a magnet.

FIG. 20 shows an arrangement relationship between the magnet 42 and the planar coil 43. As shown in FIG. 19, the magnets 42 are arranged on the yoke 41A so that an S-polar surface 42A and an N-polar surface 42B are arranged side by side. Each planar coil 43 is formed in a rectangular shape that is formed by a pair of long sides 43A and a pair of short sides 43B, and is disposed so that each long side 43A is parallel to a boundary line 42C between the S-polar surface 42A and the N-polar surface 42B. Accordingly, in a case in which current flows in the planar coil 43 in a direction indicated by arrows AI, a Lorentz force (thrust) FL acts in a direction where the S-polar surface 42A and the N-polar surface 42B are arranged that is orthogonal to the boundary line 42C. As a result, the planar coil 43 is moved. The blur-correction frame 44 is moved by the movement of the planar coil 43. For example, as described later, a blur-correction lens 73 (see FIG. 21) is held by the blur-correction frame 44.

A plurality of rectangular openings 45 are formed in the yokes 41A and 41B. The openings 45 are arranged in the form of, for example, a 2×5 matrix in which opening arrays 46 parallel to the boundary line 42C are disposed so as to be symmetric with respect to the boundary line 42C. In a case in which a long rectangular opening is disposed along the boundary line 42C or a rectangular opening is disposed on the boundary line 42C or close to the boundary line 42C, magnetic flux density is reduced. For this reason, an opening is not formed close to the boundary line 42C. Circular holes, such as the openings 23 shown in FIG. 14, may be used instead of the plurality of rectangular openings 45. The number of rectangular openings 45 arranged in a direction orthogonal to the boundary line 42C is not limited to 2, and the same number of, that is, an even number of rectangular openings 45 may be arranged on both sides of the boundary line 42C.

The VCM 40 of the second embodiment is used as a drive device of a vibration-proof mechanism 79 shown in FIG. 21 to be described later. For this purpose, two planar VCMs are arranged in an L shape, one planar VCM is referred to as an X-direction VCM, and the other planar VCM is referred to as a Y-direction VCM. The planar VCM may be used for movement in a one-dimensional direction, such as an X direction or a Y direction, in addition to movement in two-dimensional directions in an XY plane (an imaging plane of an imaging element 66 (see FIG. 21) orthogonal to an optical axis Ax (see FIG. 21)). In this case, the X-direction VCM and the Y-direction VCM are formed separately from each other.

Since the openings 45 are also formed in the VCM 40 of the second embodiment as in the first embodiment, the pair of yokes 41A and 41B can be made light without a reduction in the thrust of the planar coil 43.

The magnets 12 and 42 are disposed on one yoke 15A and one yoke 41A in the first and second embodiments, but the invention may be embodied as a double magnet type in which the magnets 12 and 42 are also disposed on the surfaces of the other yoke 15B and the other yoke 41B facing the coils.

The VCMs 10, 18, 25, 30, 37, and 40 of the invention are used in not only a lens moving device and an imaging apparatus 60 to be described below but also various drive devices.

An imaging apparatus using the VCMs 10 and 40 will be described as an example with reference to FIGS. 21 to 24. An imaging apparatus 60 includes a lens unit 61 as an optical device and a camera body 62 as an imaging unit. The lens unit 61 is formed as an interchangeable lens unit, and allows the imaging element 66 provided in the camera body 62 to take a subject image. The lens unit 61 includes a connector 63 that is attachable to and detachable from the camera body 62. The lens unit 61 may be integrated with the camera body 62.

The lens unit 61 comprises an optical system 64 in a lens barrel member 65. The optical system 64 includes first to fifth lenses 71 to 75 that are arranged in this order from a subject side along the optical axis Ax. Each of the first to fifth lenses 71 to 75 is schematically shown as one lens, but may be a plurality of lens groups.

The camera body 62 comprises the imaging element 66 that takes an optical image of a subject obtained through the optical system 64. A control unit 67 inputs information about various imaging conditions, such as an imaging timing, to the imaging element 66, and receives image signals that are taken by and output from the imaging element 66. Then, the control unit 67 performs analog processing and digital processing on the received image signals and generates taken image data to be output.

A first focus mechanism 76, a stop mechanism 78, a vibration-proof mechanism 79, and a second focus mechanism 77 are arranged in the lens barrel member 65 in this order from the subject side. The first focus mechanism 76, the second focus mechanism 77, and the vibration-proof mechanism 79 function as a lens moving device of the invention.

A focus ring 68 is rotatably mounted on the outer periphery of the lens barrel member 65. In a case in which manual focusing is to be performed, for example, a first focus lens 72 as the second lens and a second focus lens 74 as the fourth lens are individually moved in the direction of the optical axis Ax (hereinafter, simply referred to as an optical axis direction) according to the rotation of the focus ring 68 when the focus ring 68 is rotated. The first focus lens 72 and the second focus lens 74 are arranged at predetermined positions corresponding to an imaging distance on the optical axis by the movement of the first focus lens 72 and the second focus lens 74, and can perform focusing.

The first lens 71 and the fifth lens 75 are stationary lenses, and are fixed on the front end side (subject side) and the rear end side (imaging element side) of the lens barrel member 65, respectively. The first focus lens 72 as the second lens, a blur-correction lens 73 as the third lens, and the second focus lens 74 as the fourth lens are movable lenses.

The first focus lens 72 is driven by the first focus mechanism 76 and is moved in the optical axis direction. The second focus lens 74 is driven by the second focus mechanism 77 and is moved in the optical axis direction.

Figure 22:
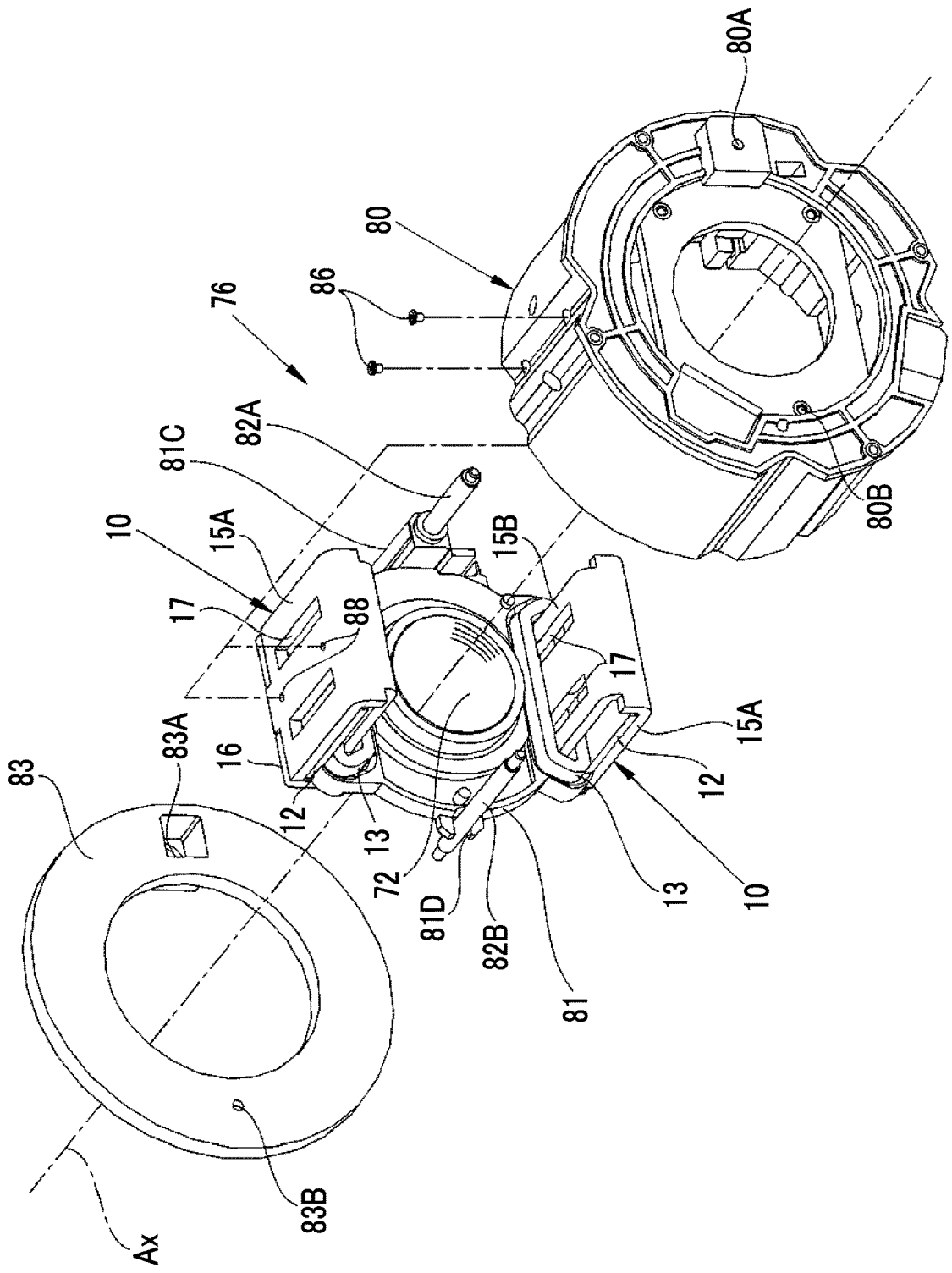
FIG. 22 is an exploded perspective view of a lens moving unit of a focus mechanism in an optical axis direction.
Figure 23:
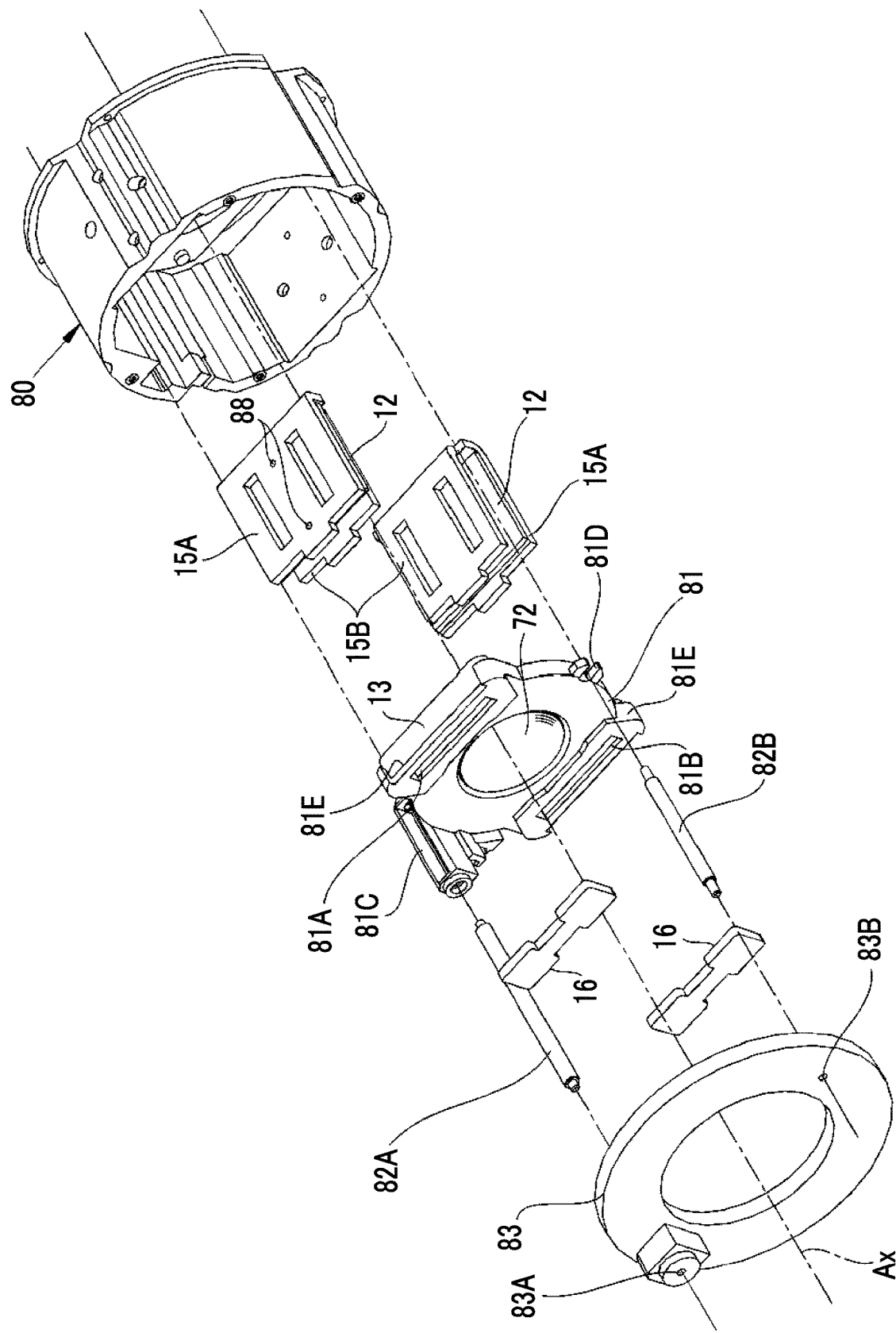
FIG. 23 is an exploded perspective view of the focus mechanism in the optical axis direction that is viewed from the rear side.

As shown in FIGS. 22 to 24, the first focus mechanism 76 as the lens moving device includes a pair of VCMs 10, a cylindrical focus barrel 80, a focus lens frame 81, a pair of guide rods 82A and 82B, and a base plate 83. The focus barrel 80 functions as a first member to which the outer yoke 15A is to be connected. The focus lens frame 81 is connected to the coil 13 and functions as a second member. The first focus mechanism 76 moves the focus barrel 80 and the focus lens frame 81 relative to each other in the coil-moving direction DC by the application of current to the coil 13, so that the first focus mechanism 76 moves the first focus lens 72. Although not shown, a position sensor for focusing is further provided.

As shown in FIG. 23, the focus lens frame 81 is formed in the shape of a disc and holds the first focus lens 72 at the center thereof through which the optical axis Ax passes. Openings 81A and 81B where the inner yokes 15B of the VCMs 10 are to be mounted are formed at the upper and lower portions of the focus lens frame 81.

A sliding cylinder 81C is formed on the left side of the focus lens frame 81, and a sliding groove 81D is formed on the right side of the focus lens frame 81. The guide rod 82A is inserted into the sliding cylinder 81C, and the guide rod 82B is inserted into the sliding groove 81D.

The guide rods 82A and 82B are disposed between the end face of the focus barrel 80 and the base plate 83 in parallel with the optical axis Ax. The pair of guide rods 82A and 82B is arranged to be spaced from the optical axis Ax as a center in a diameter direction orthogonal to the optical axis Ax. As shown in FIG. 22, both end portions of the guide rods 82A and 82B are inserted into and fixed to holding holes 80A, 80B, 83A, and 83B that are provided on the end face of the focus barrel 80 and the base plate 83. The focus lens frame 81 is held by the pair of guide rods 82A and 82B so as to be movable in the optical axis direction.

As shown in FIGS. 22 and 24, the outer yoke 15A is fixed to the inner peripheral surface of the focus barrel 80 by mounting screws 86. For this purpose, screw holes 88 are formed in the outer yokes 15A. The outer and inner yokes 15A and 15B are disposed in parallel with the optical axis Ax in a longitudinal section including the optical axis Ax (a section taken along the optical axis direction). The inner yokes 15B are positioned closer to the optical axis Ax than the outer yokes 15A.

As shown in FIG. 23, the focus lens frame 81 includes coil storage portions 81E that are formed around the openings 81A and 81B. The inner yokes 15B are inserted into the openings 81A and 81B. The coil 13 is stored in each coil storage portion 81E. After the inner yokes 15B are inserted into the openings 81A and 81B, the fitting-protruding pieces 15D of the outer and inner yokes 15A and 15B are fitted to the fitting grooves 16A of the connecting plates 16. Accordingly, the outer and inner yokes 15A and 15B and the connecting plates 16 are integrated.

In a case in which current is applied to the coils 13, the coils 13 are moved along the inner yokes 15B. The focus lens frame 81, which holds the coils 13, is moved by the movement of the coils 13. The first focus lens 72 is set to a predetermined position in the optical axis direction by the movement of the focus lens frame 81, and focusing is performed.

The position sensor for focusing (not shown) detects the position of the focus lens frame 81 in the optical axis direction. The position sensor for focusing includes a rod-like position-detection magnet and a magnetic sensor. The position-detection magnet is mounted on the sliding cylinder 81C of the focus lens frame 81. For example, a GMR element using a giant magneto resistive effect (GMR) is used as the magnetic sensor. The magnetic sensor is mounted on the focus barrel 80. The magnetic sensor detects the magnetism of the position-detection magnet and outputs a detection signal corresponding to the strength of the magnetism.

The output signal of the magnetic sensor is sent to the control unit 67 of the camera body 62. The control unit 67 detects the position of the focus lens frame 81 in the optical axis direction on the basis of the output signal of the magnetic sensor, and moves the first focus lens 72 to a desired position by the first focus mechanism 76 to perform focusing.

In this embodiment, as shown in FIG. 22, guide positions where the focus lens frame 81 is to be guided by the guide rods 82A and 82B and the positions where a magnetic force acts on the focus lens frame 81 by the application of current to the coils 13 are positioned on concentric circles having a center on the optical axis Ax. For this reason, since the guide rods 82A and 82B, the magnets 12, the outer yokes 15A, and the inner yokes 15B are arranged around the optical axis Ax in balance, the focus lens frame 81 can be smoothly moved in the optical axis direction.

Figure 21:
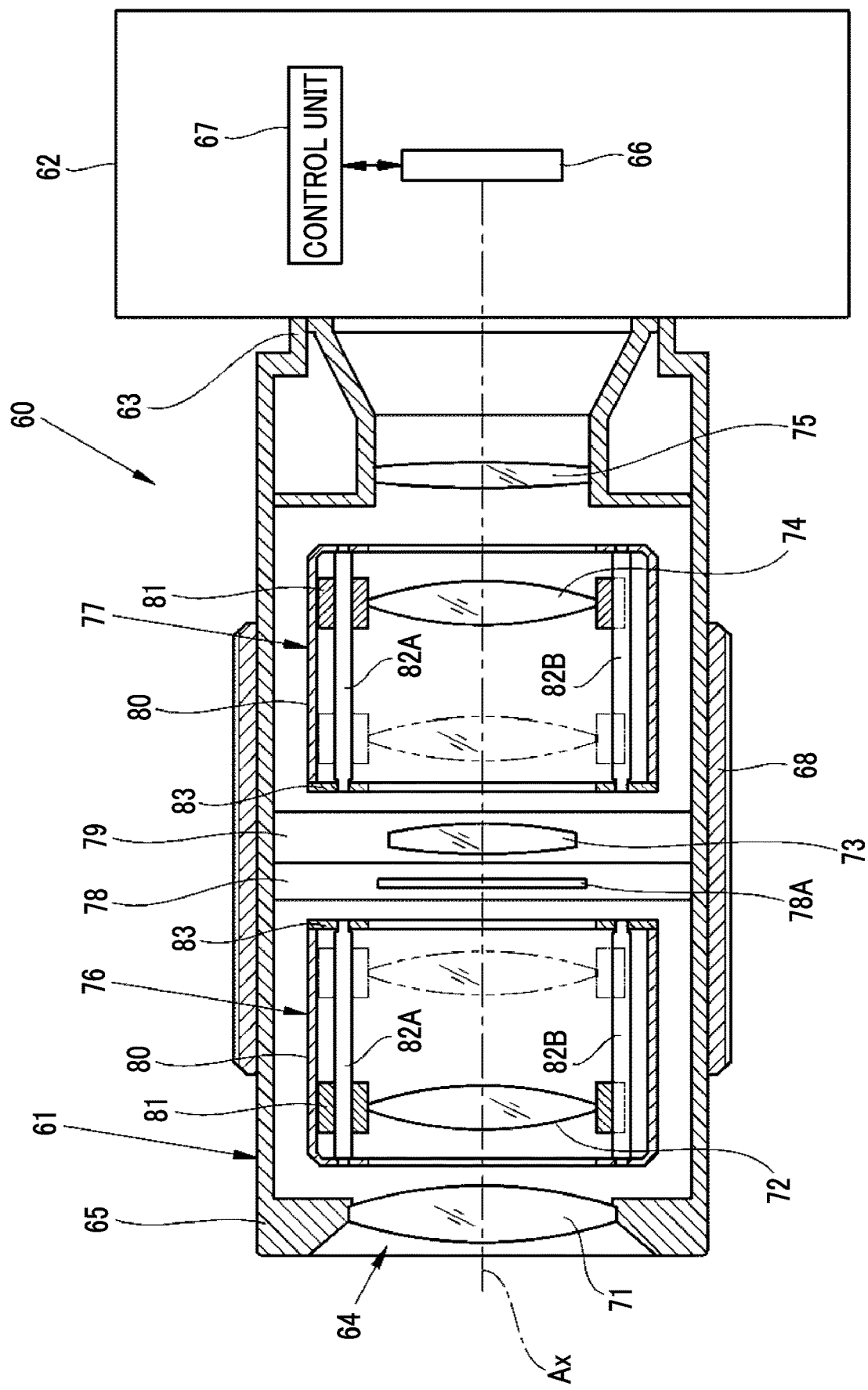
FIG. 21 is a cross-sectional view showing the schematic structure of an imaging apparatus of the invention.

As shown in FIG. 21, the second focus mechanism 77 has the same structure as the first focus mechanism 76 except that the second focus lens 74 is mounted on the focus lens frame 81 instead of the first focus lens 72. For this reason, the same components will be denoted by the same reference numerals and the repeated description thereof will be omitted. A direction in which the second focus mechanism 77 is mounted and a direction in which the first focus mechanism 76 is mounted are opposite to each other in a front-rear direction, but may be the same direction.

The stop mechanism 78 and the vibration-proof mechanism 79 are mounted between the first focus mechanism 76 and the second focus mechanism 77. The stop mechanism 78 includes a stop leaf blade 78A that is disposed around the optical axis Ax. The amount of imaging light, which is to be incident on the camera body 62, is adjusted by an increase and reduction in the diameter of a stop opening that is formed by the stop leaf blade 78A.

As described above, the vibration-proof mechanism 79 corrects image blur by displacing the blur-correction lens 73 in an XY plane in a direction, in which image blur is to be canceled, with the planar VCM 40 of the second embodiment in which the X-direction VCM and the Y-direction VCM are integrated with each other. The blur-correction lens 73 is mounted on the blur-correction frame 44 shown in FIG. 18, and the like. The blur-correction frame 44 is held so as to be movable within a vibration-proof frame in the X and Y directions.

Next, the action of the imaging apparatus 60 of this embodiment will be described. In a case in which imaging is started by a release operation, the first and second focus mechanisms 76 and 77 are operated and the first and second focus lenses 72 and 74 are moved in the optical axis direction, and focusing control is performed. In a case in which the focusing control of the plurality of focus lenses 72 and 74 is performed by the first and second focus mechanisms 76 and 77 as described above, a lens-moving distance is dispersed. Accordingly, quick focusing can be performed. Particularly, since the plurality of focus lenses 72 and 74 are moved, quick and accurate focusing can be performed in macro imaging. Further, in a case in which the shake of the imaging apparatus 60 is detected, the vibration-proof mechanism 79 is operated and moves the blur-correction lens 73 in the XY plane. Accordingly, image blur is corrected.

Since a reduction in a thrust is removed by as much as a reduction in the opposite thrust in the case of a trapezoidal coil, a thrust can be increased with a simple structure. Further, since the circumferential length Lct (see FIG. 3) of the coil 13 can be made short while a thrust is increased, weight can be reduced. Moreover, weight can be reduced due to the openings 17 while a reduction in a thrust is suppressed. Accordingly, since the VCMs 10, 18, 25, and 30, which are light and of which a reduction in a thrust is suppressed, are used, it is possible not only to improve the focusing performance of the imaging apparatus 60 but also to contribute to a reduction in the weight of the imaging apparatus 60.

Focusing control has been performed with two focus mechanisms 76 and 77, but focusing control may be performed with one focus mechanism.

EXPLANATION OF REFERENCES

10, 18, 25, 30, 37, 40: voice coil motor (VCM)
11: yoke
12: magnet
13: coil
13A: inner long side
13B: outer long side
15: yoke body
15A: outer yoke (magnet holding portion)
15B: inner yoke (coil insertion portion)
15C: connecting portion
15D: fitting-protruding piece
16: connecting plate
16A: fitting groove
17: opening
21: circular mark
22: triangular mark
23: opening
24: yoke body
26A: outer yoke
26B: inner yoke
27: inclined surface (chamfer)
28: coil
28A: inner long side
28B: outer long side
31A: outer yoke
31B: inner yoke
32: inclined surface
33: coil
35A: outer yoke
35B: inner yoke
36: coil
36A: inner long side
36B: outer long side
41A: yoke (magnet holding portion)
41B: yoke (coil receiving portion)
42: magnet
42A: S-polar surface
42B: N-polar surface
42C: boundary line
43: planar coil
43A: long side
43B: short side
44: blur-correction frame
45: opening
46: opening array
60: imaging apparatus
61: lens unit (optical device)
62: camera body (imaging unit)
63: connector
64: optical system
65: lens barrel member
66: imaging element
67: control unit
68: focus ring
71: first lens
72: first focus lens (second lens)
73: blur-correction lens (third lens)
74: second focus lens (fourth lens)
75: fifth lens
76: first focus mechanism (lens moving device)
77: second focus mechanism (lens moving device)
78: stop mechanism
78A: stop leaf blade
79: vibration-proof mechanism (lens moving device)
80: focus barrel (first member)
80A: holding hole
80B: holding hole
81: focus lens frame (second member)
81A: opening
81B: opening
81C: sliding cylinder
81D: sliding groove 81E: coil storage portion
82A: guide rod
82B: guide rod
83: base plate
83A: holding hole
83B: holding hole
86: mounting screw
88: screw hole
AHC1: hatched region
AHC2: hatched region
AHD: difference region
AHE: hatched region
AHF: hatched region
AI: arrow showing flow of current
Ax: optical axis
DC: moving direction of coil (coil-moving direction)
F: thrust
FL: Lorentz force
Fb, Fc, Fe, Ft: thrust
G1: broken line representing thrust at each coil position in case in which VCM including trapezoidal coil is used
G2: broken line representing thrust at each coil position in case in which VCM including rectangular coil is used
GC1: curve representing magnetic flux density distribution at middle position
GC2: curve representing magnetic flux density distribution at middle position in case openings are not formed
GE: curve representing magnetic flux density distribution at start position
GF1: broken line representing distribution of thrust in coil-moving direction
GF2: broken line representing distribution of thrust in coil-moving direction in case in which openings are not formed
H: total width of openings
Lit: inner wire length of trapezoidal coil
Lot: outer wire length of trapezoidal coil
Lcr: circumferential length of rectangular coil
Lct: circumferential length of trapezoidal coil
WO: width of outer yoke
WI: width of inner yoke
t1: thickness of yoke

What is claimed is:

1. A voice coil motor comprising:
a yoke that includes a magnet holding portion and a coil insertion portion held in parallel with the magnet holding portion with a gap therebetween;
a magnet that is fixed to a surface of the magnet holding portion facing the coil insertion portion; and
a coil which is inserted into the coil insertion portion and is moved along the coil insertion portion by the application of current; and
an opening that is provided in the magnet holding portion toward both end positions of the magnet holding portion from a middle position of movement positions of the coil and is formed to pass through the magnet holding portion.

2. The voice coil motor according to claim 1,
wherein the opening is a rectangular slit that is formed to be long in a moving direction of the coil.

3. The voice coil motor according to claim 2,
wherein a plurality of the openings are arranged in a direction orthogonal to the moving direction of the coil.

4. The voice coil motor according to claim 1,
wherein the opening is a plurality of through-holes arranged in a moving direction of the coil.

5. The voice coil motor according to claim 1,
wherein the opening is also formed in the coil insertion portion.

6. The voice coil motor according to claim 5,
wherein the opening of the coil insertion portion is formed at a position facing the opening of the magnet holding portion.

7. The voice coil motor according to claim 1,
wherein an opening width, which is a length of the opening in the direction orthogonal to the moving direction, is determined so that an integrated value of magnetic flux density distribution in the direction orthogonal to the moving direction of the coil at a portion where the opening is provided is equal to an integrated value of magnetic flux density distribution in the direction orthogonal to the moving direction at a start position, where the opening is not formed, of the movement positions of the coil.

8. The voice coil motor according to claim 1,
wherein an opening width, which is a length of the opening in the direction orthogonal to the moving direction, is determined so that a difference integrated value, which is obtained by subtracting an integrated value of magnetic flux density distribution in the direction orthogonal to the moving direction at a start position of the movement positions of the coil from an integrated value of magnetic flux density distribution in the direction orthogonal to the moving direction of the coil at the middle position, is equal to an integrated value of a reduction in magnetic flux density distribution caused by the opening in the direction orthogonal to the moving direction.

9. The voice coil motor according to claim 1,
wherein in a case in which a total width, which is the sum of lengths of the plurality of openings in the direction orthogonal to the moving direction of the coil, is denoted by H, a width of the yoke is denoted by WO, a remaining width, which is obtained by subtracting the total width H from the width WO of the yoke, is denoted by NH, and a thickness of the yoke is denoted by t1, the total width H and the remaining width NH satisfy "H≥t1", "NH≥t1", and "(WO/2)≥H".

10. The voice coil motor according to claim 1,
wherein the coil is formed in a trapezoidal shape where a coil wire length of a portion of the coil opposite to the magnet is shorter than a coil wire length of a portion of the coil facing the magnet in a state in which the coil is viewed in the moving direction of the coil.

11. The voice coil motor according to claim 10,
wherein a width of the coil insertion portion is smaller than a width of the magnet holding portion that is a length of the magnet holding portion in the direction orthogonal to the moving direction of the coil.

12. The voice coil motor according to claim 10,
wherein both end portions of a surface of the coil insertion portion, which is opposite to a surface of the coil insertion portion facing the magnet, in the direction orthogonal to the moving direction of the coil include chamfers.

13. A lens moving device comprising:
the voice coil motor according to claim 1;
a first member that is connected to the yoke; and
a second member that is connected to the coil,
wherein the first member and the second member are moved relative to each other in the moving direction of the coil by the application of current to the coil, so that a lens is moved.

14. A voice coil motor comprising:
a yoke that includes a magnet holding portion and a coil receiving portion held in parallel with the magnet holding portion with a gap therebetween;
a magnet that is fixed to a surface of the magnet holding portion facing the coil receiving portion and includes an N-polar surface on one side of a boundary line and an S-polar surface on the other side thereof;
a coil that is provided between the magnet and the coil receiving portion and is moved along the coil receiving portion in a direction orthogonal to the boundary line; and
a plurality of openings that are formed to pass through the magnet holding portion and are arranged on both sides of the boundary line in parallel with the boundary line.

* * * * *